(12) United States Patent
Pataut et al.

(10) Patent No.: US 12,215,207 B2
(45) Date of Patent: Feb. 4, 2025

(54) METHOD FOR PRODUCING A PRODUCT REINFORCED BY A REINFORCING ELEMENT

(71) Applicant: COMPAGNIE GENERALE DES ETABLISSEMENTS MICHELIN, Clermont-Ferrand (FR)

(72) Inventors: Gael Pataut, Clermont-Ferrand (FR); David Doisneau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 823 days.

(21) Appl. No.: 16/954,073

(22) PCT Filed: Nov. 26, 2018

(86) PCT No.: PCT/FR2018/052982
§ 371 (c)(1),
(2) Date: Jun. 15, 2020

(87) PCT Pub. No.: WO2019/115900
PCT Pub. Date: Jun. 20, 2019

(65) Prior Publication Data
US 2022/0227947 A1   Jul. 21, 2022

(30) Foreign Application Priority Data
Dec. 15, 2017 (FR) ........................ 1762247

(51) Int. Cl.
*C08J 5/04* (2006.01)
*B60C 1/00* (2006.01)
*C08J 5/24* (2006.01)

(52) U.S. Cl.
CPC ............... *C08J 5/04* (2013.01); *B60C 1/0041* (2013.01); *C08J 5/246* (2021.05); *C08J 5/249* (2021.05); *B60C 2001/0066* (2013.01); *C08J 2361/12* (2013.01)

(58) Field of Classification Search
CPC .. C08J 5/04; C08J 2361/12; B60C 2001/0066
See application file for complete search history.

(56) References Cited

U.S. PATENT DOCUMENTS

| | | |
|---|---|---|
| 7,250,463 B2 | 7/2007 | Durel et al. |
| 7,820,771 B2 | 10/2010 | Lapra et al. |
| 8,245,490 B2 | 8/2012 | Barguet et al. |
| 8,650,850 B2 | 2/2014 | Barguet et al. |
| 8,763,662 B2 | 7/2014 | Abad et al. |
| 8,785,543 B2 | 7/2014 | Abad et al. |
| 8,790,788 B2 | 7/2014 | Custodero et al. |
| 8,968,871 B2 | 3/2015 | Abad et al. |
| 8,973,634 B2 | 3/2015 | Custodero et al. |
| 9,540,766 B2 | 1/2017 | Abad et al. |
| 10,544,298 B2 | 1/2020 | Doisneau et al. |
| 10,604,613 B2 | 3/2020 | Doisneau et al. |
| 2004/0241331 A1* | 12/2004 | Durairaj ................ C08L 61/14 427/387 |
| 2005/0004297 A1 | 1/2005 | Durel et al. |
| 2006/0237110 A1 | 10/2006 | Barguet et al. |
| 2008/0132644 A1 | 6/2008 | Lapra et al. |
| 2009/0270558 A1 | 10/2009 | Gandon-pain et al. |
| 2010/0288412 A1 | 11/2010 | Barguet et al. |
| 2012/0125506 A1 | 5/2012 | Custodero et al. |
| 2012/0128972 A1 | 5/2012 | Custodero et al. |
| 2012/0180921 A1 | 7/2012 | Abad et al. |
| 2012/0267023 A1 | 10/2012 | Abad et al. |
| 2012/0279629 A1 | 11/2012 | Barguet et al. |
| 2012/0298281 A1 | 11/2012 | Barguet et al. |
| 2013/0177764 A1 | 7/2013 | Abad et al. |
| 2013/0273366 A1 | 10/2013 | Abad et al. |
| 2013/0280511 A1 | 10/2013 | Abad et al. |
| 2014/0044964 A1 | 2/2014 | Abad et al. |
| 2014/0045984 A1 | 2/2014 | Abad et al. |
| 2014/0051312 A1 | 2/2014 | Abad et al. |
| 2017/0174006 A1 | 6/2017 | Michoud et al. |
| 2017/0362370 A1 | 12/2017 | Doisneau et al. |
| 2018/0016433 A1 | 1/2018 | Doisneau et al. |
| 2019/0077952 A1* | 3/2019 | Thuilliez .................. C08L 7/00 |

(Continued)

FOREIGN PATENT DOCUMENTS

| | | | | |
|---|---|---|---|---|
| FR | 3049611 A1 * | 10/2017 | ............ | C09J 161/06 |
| JP | 11-130883 A | 5/1999 | | |
| WO | 97/36724 A2 | 10/1997 | | |
| WO | 99/16600 A1 | 4/1999 | | |
| WO | 03/16387 A1 | 2/2003 | | |
| WO | 2005/071157 A1 | 8/2005 | | |
| WO | 2006/069792 A1 | 7/2006 | | |
| WO | 2006/069793 A1 | 7/2006 | | |
| WO | 2010/105975 A1 | 9/2010 | | |
| WO | 2010/136389 A1 | 12/2010 | | |
| WO | 2011/012521 A1 | 2/2011 | | |
| WO | 2011/051204 A1 | 5/2011 | | |
| WO | 2012/016757 A1 | 2/2012 | | |
| WO | 2012/038340 A1 | 3/2012 | | |

(Continued)

OTHER PUBLICATIONS

International Search Report dated Mar. 21, 2019, in corresponding PCT/FR2018/052982 (5 pages).

*Primary Examiner* — Jane L Stanley
(74) *Attorney, Agent, or Firm* — VENABLE LLP

(57) ABSTRACT

A process for the manufacture of a reinforced product comprising a matrix based on a composition and at least one reinforcing element, the reinforcing elements being embedded in the matrix, comprises: mixing of the composition based on: a compound A1 with a melting point T1, and a compound A2 with a melting point T2, at a temperature Tm such that: $T1 \leq Tm < T2$, so as to dissolve A2 in A1 and to obtain the composition in the liquid state; submerging of the reinforcing element(s) (36) in the composition; and cross-linking by heating of the composition at a temperature Tn such that: $T1 \leq Tm < Tn$.

12 Claims, 3 Drawing Sheets

(56) References Cited

U.S. PATENT DOCUMENTS

2019/0112512 A1* 4/2019 Doisneau .................. C09J 5/02
2019/0145493 A1  5/2019 Doisneau et al.

FOREIGN PATENT DOCUMENTS

| WO | 2012/038341 A1 | 3/2012 | |
|---|---|---|---|
| WO | 2012/069346 A1 | 5/2012 | |
| WO | 2012/104279 A1 | 8/2012 | |
| WO | 2012/104280 A1 | 8/2012 | |
| WO | 2015/118041 A1 | 8/2015 | |
| WO | 2016/116468 A1 | 7/2016 | |
| WO | 2016/116470 A1 | 7/2016 | |
| WO | WO 2017050954 A1 * | 3/2017 | ........... C07C 69/017 |
| WO | 2017/198967 A1 | 11/2017 | |

* cited by examiner

METHOD FOR PRODUCING A PRODUCT REINFORCED BY A REINFORCING ELEMENT

BACKGROUND

The field of the present invention is that of products reinforced by at least one reinforcing element, such as those used in the field of tyres.

The present invention relates more particularly to a process for the manufacture of a product reinforced with at least one reinforcing element comprising a stage of manufacture of a composition comprising a mixture of two compounds, a stage of drowning one or more reinforcing element(s) in this composition and a stage of crosslinking by heating a resin based on the two compounds, to a product reinforced with at least one reinforcing element obtained by this process, to an elastomer composite comprising this product reinforced with at least one reinforcing element, as well as to a tyre comprising this product reinforced with at least one reinforcing element or this composite.

There is known, from the state of the art, a process for the manufacture of a reinforced product comprising a matrix and reinforcing elements embedded in the matrix. This process comprises a stage of manufacture of a composition comprising a mixture of two compounds forming base constituents of a resin. In order to mix the two compounds and to obtain a liquid composition which can be easily handled, in particular in order to be able to drown the reinforcing elements in this composition, a solvent is used, in relatively large amounts, in order to dissolve the two compounds. Examples of solvents, for example organic solvents, commonly used are methanol and ethylene glycol. Such a liquid composition exhibits a relatively satisfactory open time. It should be remembered that, in a way known to a person skilled in the art, the open time is the period of time during which the composition can be used under normal conditions.

Then, the reinforcing elements are drowned in the liquid composition. Finally, a stage of crosslinking of the resin is carried out by heating the composition so as to form the matrix in which the reinforcing elements are embedded.

The use of solvents to ensure the mixing of the two compounds and the ability of the composition to be handled requires one or more stages of removal of the solvents. A significant part of the solvents is thus in particular removed by evaporation during the stage of crosslinking of the resin by heating. However, such an evaporation creates a shrinkage within the matrix, that is to say a geometric contraction of the matrix, and thus a dimensional variation of the reinforced product, which is more or less predictable.

The aim of the invention is to obtain reinforced products while reducing as much as possible the amount of solvents used to mix the base constituents of the resin, in particular in order to avoid the shrinkage of the matrix.

SUMMARY

In a first embodiment, a subject-matter of the invention is a process for the manufacture of a reinforced product comprising a matrix based on a composition and at least one reinforcing element, the reinforcing element(s) being embedded in the matrix, in which:
a stage of manufacture of the composition comprising a mixture comprising:
at least one compound A1 exhibiting a melting point T1, and
at least one compound A2 exhibiting a melting point T2,
is carried out by mixing at least the compound A1 and at least the compound A2 at a temperature Tm such that:
$T1 \leq Tm < T2$, so as to dissolve A2 in A1 and to obtain the composition in the liquid state,
then the reinforcing element(s) is/are drowned in the composition in the liquid state,
then, as the compound A1 reacts with the compound A2 to form the resin by heating from a temperature Tm, a stage of crosslinking a resin based on at least the compound A1 and on at least the compound A2 is carried out by heating the composition to at least the temperature Tn such that $T1 \leq Tm < Tn$ so as to form the matrix in which the reinforcing element(s) is/are embedded.

The invention makes it possible to obtain reinforced products while reducing, indeed even eliminating, the amount of solvents used to mix the base constituents of the resin, in particular in order to avoid the shrinkage of the matrix. This is because the process according to the invention makes it possible, during the mixing stage, to melt the compound A1 by choosing a temperature Tm greater than T1. The molten compound A1 then forms a liquid solvent, thus making possible the dissolution of the other compound A2 without it being necessary to add a large amount of solvent, unlike the state of the art. In the case where a solvent is necessary, A1 and the organic solvent or water form a solvent in which A2 is dissolved. Thus, the composition obtained is easy to handle due to its liquid state.

The choice of Tm between T1 and T2 makes it possible to melt A1 and the choice of Tm lower than Tn makes it possible to avoid the crosslinking of the resin. Thus, the composition obtained exhibits a relatively long open time which makes it possible to carry out the drowning stage without a constraint related to a possible premature crosslinking of the resin. It should be noted that the process according to the invention has the advantage of making it possible to drown the reinforcing elements in a homogeneous manner in the matrix as a result of the liquid state of the composition during the drowning stage without, however, having to use solvent. In addition, the homogeneous dispersion of the compounds A1 and A2 in the composition in the liquid state ensures homogeneous mechanical properties in the matrix. The compound A1 and the compound A2 have chemical structures such that, at the temperature Tn, they react together.

Preferably, the composition is devoid of solvents chosen from ethyl acetate, butyl acetate, methyl acetate, ethyl acetoacetate, acetone, acetonitrile, glacial acetic acid, methanoic acid, ammonia, acetic anhydride, aniline, anisole, benzene, butanol, butanone, chlorobenzene, chloroform, cyclohexane, cyclopentane, dichloroethane, dichloromethane, diisopropyl ether, dimethylformamide, dimethyl sulfoxide, dioxane, ETBE, ethanol, glycol ether, diethyl ether, ethylene glycol, freon, heptane, hexamethylphosphoramide, hexane, methanol, nitrobenzene, pentane, perchloroethylene, propanol, propoxypropane, pyridine, carbon disulfide, tetrachloroethane, tetrachloromethane, tetrahydrofuran, toluene, trichloroethane, trichloroethylene, trimethylpentane, xylene and water.

More preferentially, the composition is devoid of any organic solvent or of water.

Devoid of organic solvent or devoid of water is understood to mean that the total content by weight of solvent belonging to the groups described above or of water by total weight of the composition is less than or equal to 10%, preferably less than or equal to 5%, more preferentially less than or equal to 2% and more preferentially still less than or equal to 1%.

In a second embodiment, the invention relates to a process for the manufacture of a reinforced product comprising a matrix based on a composition and at least one reinforcing element, the reinforcing element(s) being embedded in the matrix, in which:

a stage of manufacture of the composition comprising a mixture comprising:
at least one compound A3 exhibiting a melting point T3,
at least one compound A4 exhibiting a melting point T4, and
at least one compound A5 exhibiting a melting point T5, is carried out by mixing at least the compounds A3, A4 and A5 at a temperature Tm such that:
Tmin≤Tm<Tmax, in which:
Tmin is the lowest temperature among T3, T4 and T5,
Tmax is the highest temperature among T3, T4 and T5, and
Tint is the temperature among T3, T4 and T5 such that Tmin≤Tint≤Tmax, so as to dissolve at least one or two of the compounds A3, A5, A4 respectively in at least two others or another of the compounds A3, A5, A4 and to obtain a composition in the liquid state,
then the reinforcing element(s) is/are drowned in the composition in the liquid state,
then, as the compounds A3, A4 and A5 react together to form the resin by heating from a temperature Tn, a stage of crosslinking a resin based on at least the compounds A3, A4 and A5 is carried out by heating the composition to at least the temperature Tn such that Tmin≤Tm<Tn so as to form the matrix in which the reinforcing element(s) is/are embedded.

The process according to the second embodiment of the invention makes it possible, during the mixing stage, to melt one or two of the compounds A3, A4 or A5 by choosing a temperature Tm greater than Tmin. The molten compound(s) then form(s) a liquid solvent, thus making possible the dissolution of the other compound(s) without it being necessary to add a large amount of solvent, unlike the state of the art. In the case where a solvent is necessary, one or two of the compounds chosen from A3, A4 or A5 and the organic solvent or water form a solvent in which one or two of the compounds chosen from A3, A4 or A5 are dissolved.

The compounds A3, A4 and A5 have chemical structures such that, at the temperature Tn, they react together.

In a third embodiment, the invention relates to a process for the manufacture of a reinforced product comprising a matrix based on a composition and at least one reinforcing element, the reinforcing element(s) being embedded in the matrix, in which:

a stage of manufacture of the composition comprising a mixture comprising:
at least one compound A3 exhibiting a melting point T3,
at least one compound A4 exhibiting a melting point T4,
at least one compound A5 exhibiting a melting point T5,
at least one compound A6 exhibiting a melting point T6, is carried out by mixing at least the compounds A3, A4, A5 and A6 at a temperature Tm such that:
Tmin≤Tm<Tmax, in which:
Tmin is the lowest temperature among T3, T4, T5 and T6, and
Tmax is the highest temperature among T3, T4, T5 and T6,
Tint1 is the temperature among T3, T4, T5 and T6, and
Tint2 is the temperature among T3, T4, T5 and T6 such that:
Tmin≤Tint1≤Tint2≤Tmax, so as to dissolve one, two or three of the compounds A3, A4, A5, A6 in respectively three, two or another of the compounds A3, A4, A5, A6 and to obtain a composition in the liquid state;
then the reinforcing element(s) (36) is/are drowned in the composition in the liquid state,
then, as the compounds A3, A4, A5 and A6 react together to form the resin by heating from a temperature Tn, a stage of crosslinking a resin based on at least the compounds A3, A4, A5 and A6 is carried out by heating the composition to at least the temperature Tn such that Tmin≤Tm<Tn so as to form the matrix (38) in which the reinforcing element(s) is/are embedded.

The process according to the third embodiment of the invention makes it possible, during the mixing stage, to melt one or two of the compounds A3, A4, A5 or A6 by choosing a temperature Tm greater than Tmin. The molten compound(s) then form(s) a liquid solvent, thus making possible the dissolution of the other compound(s) without it being necessary to add a large amount of solvent, unlike the state of the art. In the case where a solvent is necessary, one, two or three of the compounds chosen from A3, A4, A5 or A6 and the organic solvent or water form a solvent in which one, two or three of the compounds chosen from A3, A4, A5 or A6 are dissolved.

The compounds A3, A4, A5 and A6 have chemical structures such that, at the temperature Tn, they react together.

Advantageously, the use of a mixture of three or four compounds makes it possible, on the one hand, to dissolve all of the compounds by virtue of the compound exhibiting the lowest melting point and, on the other hand, to use the mechanical properties conferred by the other compounds exhibiting melting points greater than Tm. In addition, as in the first embodiment, it should be noted that the process according to the invention has the advantage of making it possible to drown the reinforcing elements in a homogeneous manner in the matrix as a result of the liquid state of the composition during the drowning stage without, however, having to use solvent.

Preferably, in the three embodiments described above, the mixing stage and the crosslinking stage are carried out at the same pressure, preferably at atmospheric pressure. More preferentially, the mixing stage, the drowning stage and the crosslinking stage are carried out at the same pressure, preferably at atmospheric pressure.

Very obviously, in each of the three embodiments described above, the relevant temperature for a stage is that measured at the pressure at which this stage is carried out. For example, the relevant melting points for the mixing stage are those measured at the pressure at which the mixing stage is carried out and the relevant melting points for the crosslinking stage are those measured at the pressure at which the crosslinking stage is carried out, whether the pressure of the mixing stage is identical to or different from that of the crosslinking stage.

Another subject-matter of the invention relates to a reinforced product comprising a matrix and at least one reinforcing element, the reinforcing element(s) being embedded in the matrix, capable of being obtained by the process as defined above.

In a preferred embodiment, the reinforced product exhibits a ply, band, strip or ribbon general form extending along a main direction. The width W of the reinforced product, measured along a direction perpendicular to the main direction, and the thickness T of the reinforced product are such that W>T, preferably W>10×T.

The invention also relates to an elastomer composite comprising an elastomer matrix in which at least one reinforced product as defined above is embedded.

The invention also relates to a tyre comprising at least one reinforced product as defined above or one elastomer composite as defined above.

BRIEF DESCRIPTION OF THE FIGURES

A better understanding of the invention will be obtained on reading the description which will follow, given solely by way of non-limiting example and made with reference to the drawings, in which.

DETAILED DESCRIPTION

Figure 1:
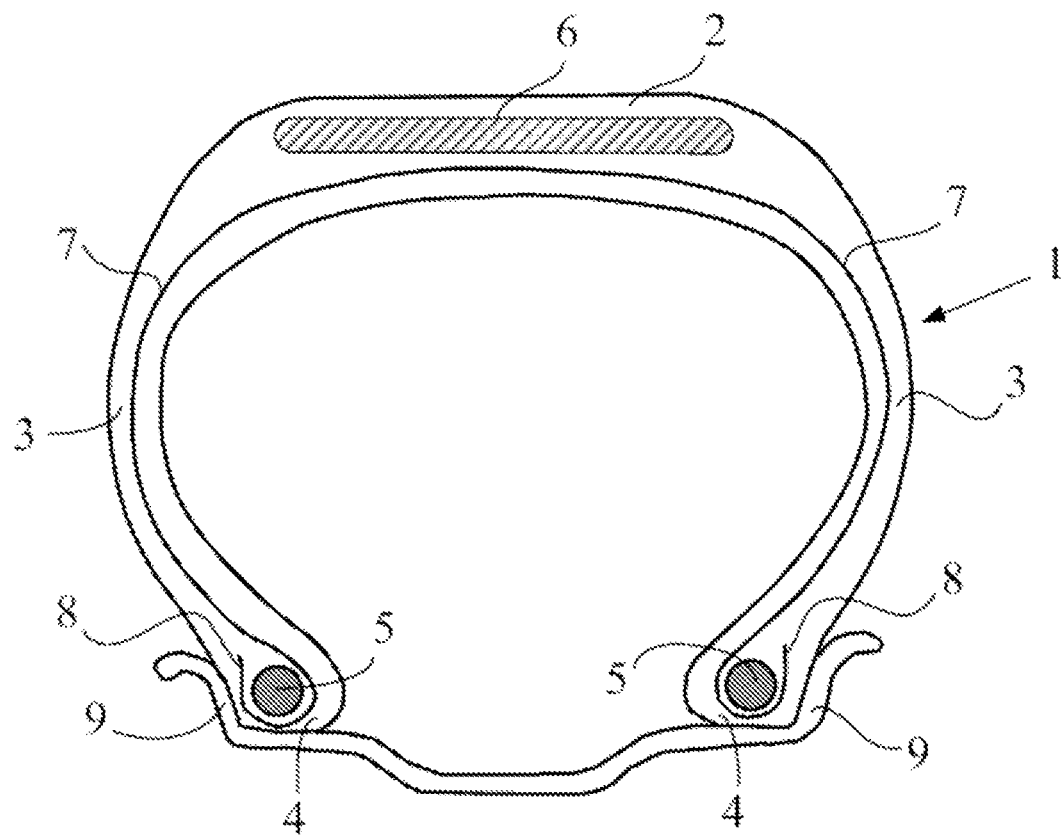
FIG. 1 is a diagram of a tyre according to the invention.

The term pce is understood to mean parts by weight per hundred parts of elastomer.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the context of the invention, the carbon-based products mentioned in the description can be of fossil or biosourced origin. In the latter case, they can partially or completely result from biomass or be obtained from renewable starting materials resulting from biomass.

The invention as well as its advantages will be easily understood in light of the description and of the implementational examples which follow.

In the present description, unless expressly indicated otherwise, all the percentages (%) indicated are % by weight.

The term composition in the liquid state is understood to mean that the composition is neither solid nor gaseous. The liquid composition can be viscous or non-viscous.

The term ambient temperature of a stage is understood to mean the temperature of the environment in which this stage is carried out, that is to say the temperature of the surrounding premises in which the stage is carried out. For example, ambient temperature is between 20° C. and 30° C.

The term elastomer composition is understood to mean a composition comprising at least one elastomer (or without distinction rubber) and at least one other constituent.

The term "diene" elastomer (or without distinction rubber) is understood to mean an elastomer resulting, at least in part (that is to say, a homopolymer or a copolymer), from diene monomer(s) (i.e., bearer(s) of two conjugated or non-conjugated carbon-carbon double bonds). The term "isoprene elastomer" is understood to mean an isoprene homopolymer or copolymer, in other words a diene elastomer selected from the group consisting of natural rubber (NR), synthetic polyisoprenes (IR), the various isoprene copolymers and the mixtures of these elastomers.

The term elastomeric matrix is understood to mean a matrix having elastomeric behaviour.

The term "meta position with respect to each other" should be understood as meaning that the hydroxyl functional groups are borne by carbons of the aromatic nucleus separated from each other by a single other carbon of the aromatic nucleus.

The term "in the ortho position with respect to a functional group" should be understood as meaning the position occupied by the carbon of the aromatic nucleus immediately adjacent to the carbon of the aromatic nucleus bearing the functional group.

The term "ring member" of a nucleus should be understood as meaning a constituent atom of the backbone of the nucleus. Thus, for example, a benzene nucleus comprises six ring members, each ring member consisting of a carbon atom. In another example, a furan nucleus comprises five ring members, four ring members each consisting of a carbon atom and the remaining ring member consisting of an oxygen atom.

"CHO" represents the aldehyde functional group.

"$CH_2OH$" represents the hydroxymethyl functional group.

The term "aromatic polyphenol" is understood to mean an aromatic compound comprising at least one benzene nucleus bearing more than one hydroxyl functional group.

The expression "composition based on" should be understood as meaning a composition comprising the mixture and/or the product of in situ reaction of the various constituents used, some of these constituents being able to react and/or being intended to react with one another, at least partially, during the various phases of manufacture of the composition; it thus being possible for the composition to be in the completely or partially crosslinked state or in the non-crosslinked state.

The expression "resin based on", should, of course, be understood as meaning a resin comprising the mixture of and/or the product of the reaction between the various base constituents used for the final condensation of this resin, preferably solely the product of the reaction between the various base constituents used for this resin, it being possible for some of them to be intended to react or to be capable of reacting with one another or with their neighbouring chemical environment, at least in part, during the various phases of the process for the manufacture of the composition, composites or tyre, in particular during a curing stage. Thus, the base constituents are the reactants intended to react together during the final condensation of the resin and are not reactants intended to react together to form these base constituents.

Reinforcing element is understood to mean a three-dimensional element which makes possible the mechanical reinforcement of a matrix in which this three-dimensional reinforcing element is intended to be embedded.

Process According to the Invention

Advantageously, $T1 \leq 110°$ C., preferably $T1 \leq 100°$ C. and more preferably $T1 \leq 90°$ C. Thus, as little energy is provided as it is possible to provide of it so as to melt the compound A1.

Advantageously, $T1 \geq 40°$ C. and preferably $T1 \geq 50°$ C.

Advantageously, $Tm-T1 \geq 1°$ C., preferably $Tm-T1 \geq 2°$ C. and more preferentially $Tm-T1 \geq 5°$ C.

Advantageously, $Tm-T1 \leq 30°$ C., preferably $Tm-T1 \leq 10°$ C. and more preferentially $Tm-T1 \leq 5°$ C.

Advantageously, $T2-T1 \geq 30°$ C., preferably $T2-T1 \geq 40°$ C. and more preferentially $T2-T1 \geq 50°$ C.

Advantageously, $T2-T1 \leq 200°$ C., preferably $T2-T1 \leq 190°$ C. and more preferentially $T2-T1 \leq 170°$ C.

The difference between the melting points T1 and T2 of the compounds A1 and A2 is preferably sufficiently great so that the interval of choice of the temperatures Tm and Tn is sufficiently great. Thus, on the one hand, the risk of incomplete melting of the compound T1 and thus a poor dissolution of the compounds A1 and A2, which would be due to an excessively small difference between T1 or T2 and Tm, is reduced. On the other hand, the risk of premature crosslinking of the resin, which would be due to poor control of Tn, is reduced.

In the first embodiment, there is preferably $T2 \geq Tn$.

In the second embodiment of the invention, there is preferably $Tint \leq Tn \leq Tmax$.

In the second embodiment of the invention, there is more preferentially $Tn \leq Tint \leq Tmax$.

In the third embodiment of the invention, there is preferably $Tint1 \leq Tint2 \leq Tn \leq Tmax$.

In the third embodiment of the invention, there is more preferentially $Tint1 \leq Tn \leq Tint2 \leq Tmax$.

In the third embodiment of the invention, there is more preferentially still $Tn \leq Tint1 \leq Tint2 \leq Tmax$.

Advantageously, in the second and third embodiments, at least one compound A3, A5, A4 or A6 has a melting point which is greater than or equal to Tn. Thus, the process can be carried out with compounds having relatively high melting points when the mixing of these is carried out with a compound of sufficiently low melting point and in sufficient amount to dissolve the mixture.

Advantageously, $Tm-Tmin \geq 1°$ C., preferably $Tm-Tmin \geq 2°$ C. and more preferentially $Tm-Tmin \geq 5°$ C.

Advantageously, $Tm-Tmin \leq 30°$ C., preferably $Tm-Tmin \leq 10°$ C. and more preferentially $Tm-Tmin \leq 5°$ C.

Advantageously, $Tmax-Tmin \geq 30°$ C., preferably $Tmax-Tmin \geq 40°$ C. and more preferentially $Tmax-Tmin \geq 50°$ C.

Advantageously, $Tmax-Tmin \leq 200°$ C., preferably $Tmax-Tmin \leq 190°$ C. and more preferentially $Tmax-Tmin \leq 170°$ C.

In a first alternative form, the process is such that, during the stage of manufacture of the composition, all the compounds are in the solid state at ambient temperature; the composition is heated to the temperature Tm strictly greater than ambient temperature.

In this first alternative form, for all the embodiments, the minimum heating necessary to dissolve the compounds will be carried out. Thus, the composition obtained is in the liquid state at Tm and exhibits a relatively long open time which makes it possible to carry out the drowning stage without a constraint related to a possible premature crosslinking of the resin.

In this second alternative form, the process is such that, during the stage of manufacture of the composition, at least one compound is in the liquid state at ambient temperature and at least one compound is in the solid state at ambient temperature, the compound in the solid state is dissolved in the compound in the liquid state at ambient temperature.

Advantageously, in this second alternative form, for the first embodiment, it is not necessary to heat in order to dissolve the compound A2 in the compound A1 because the compound A1 is already liquid at ambient temperature. Thus, the composition obtained is in the liquid state at ambient temperature and exhibits a relatively long open time which makes it possible to carry out the drowning stage without a constraint related to a possible premature crosslinking of the resin.

Advantageously, in this second alternative form, for the second and third embodiments, when one of the compounds is liquid at ambient temperature, the other compounds, which have higher melting points, will dissolve in the composition, making it possible to obtain a composition which can be easily handled due to its liquid state.

Preferably, $Tm \leq 110°$ C., preferably $Tm \leq 100°$ C. and more preferentially $Tm \leq 80°$ C.

Preferably, $Tn \leq 140°$ C., preferably $Tn \leq 130°$ C. and more preferentially $Tn \leq 120°$ C.

Advantageously, $Tn-Tm \geq 5°$ C. and more preferentially $Tn-Tm \geq 10°$ C.

Advantageously, $Tn-Tm \leq 100°$ C. and more preferentially $Tn-Tm \leq 60°$ C.

The difference between the temperatures Tm and Tn is preferentially sufficiently great to reduce the risk of premature crosslinking of the resin.

Advantageously, the process is such that, subsequent to the stage of crosslinking of the resin, a stage of final crosslinking of the resin is carried out by heating to a temperature Tp with $Tn<Tp$.

Advantageously, the pressure at which the final crosslinking stage is carried out is less than or equal to 1.50 bar, preferably less than or equal to 1.20 bar and more preferentially less than or equal to 1.10 bar.

Advantageously, the pressure at which the final crosslinking stage is carried out is strictly greater than 1.00 bar, preferably greater than or equal to 1.01 bar and more preferentially greater than or equal to 1.03 bar.

Thus, a slight excess pressure is applied in order to precisely control the dimensions of the reinforced product.

Advantageously, $Tp \leq 200°$ C.

The process according to the invention makes it possible to carry out the stage of crosslinking of the resin at a relatively low temperature, thus avoiding the degradation of the compounds. Thus, the final stage of crosslinking of the resin requires a lower energy contribution, which has the advantage of having a less expensive process.

Resin

Advantageously, in the first embodiment of the invention, the resin is obtained by the reaction of at least the compound A1 and of at least the compound A2, which are described below.

In accordance with this first embodiment, the base constituents of the resin thus comprise at least the compound A1 and at least the compound A2. In an alternative, the base constituents can comprise other additional constituents different from the compound A1 and from the compound A2. In another alternative, the base constituents are formed of at least the compound A1 and of at least the compound A2.

In the second embodiment of the invention, the resin is obtained by the reaction of at least three compounds A3, A4 and A5, as are described below.

In accordance with this second embodiment, the base constituents of the resin thus comprise at least the three compounds A3, A4 and A5. In an alternative, the base constituents can comprise other additional constituents different from the compounds A3, A4 and A5. In another alternative, the base constituents are formed of at least the three compounds A3, A4 and A5.

In the third embodiment of the invention, the resin is obtained by the reaction of four compounds A3, A4, A5 and A6, as are described below.

In accordance with this third embodiment, the base constituents of the resin thus comprise at least the four compounds A3, A4, A5 and A6. In an alternative, the base constituents can comprise other additional constituents different from the compounds A3, A4, A5 and A6. In another alternative, the base constituents are formed of at least the four compounds A3, A4, A5 and A6.

Preferably, in the three embodiments described above, a person skilled in the art will choose the proportions of the various base constituents of the resin so as to obtain the desired mechanical properties.

Preferably, in the embodiment where the base constituents comprise other additional constituents, these other additional constituents are devoid of formaldehyde and/or devoid of methylene donor selected from the group consisting of hexamethylenetetramine (HMT), hexamethoxymethylmelamine (H3M), hexaethoxymethylmelamine, lauryloxymethylpyridinium chloride, ethoxymethylpyridinium chloride, polymers of hexamethoxymethylmelamine of trioxane of formaldehyde, hexakis(methoxymethyl)melamine, N,N',N''-trimethyl-N,N',N''-trimethylolmelamine, hexamethylolmelamine, N-methylolmelamine, N,N'-dimethylolmelamine, N,N',N''-tris(methoxymethyl/melamine and N,N',N''-tributyl-N,N',N''-trimethylolmelamine. More advantageously, these other additional constituents are devoid of formaldehyde and devoid of the methylene donors described in this paragraph.

More preferably, in the embodiment where the base constituents comprise other additional constituents, these other additional constituents are devoid of formaldehyde and/or devoid of methylene donor selected from the group consisting of hexamethylenetetramine, hexaethoxymethylmelamine, hexamethoxymethylmelamine, lauryloxymethylpyridinium chloride, ethoxymethylpyridinium chloride, hexamethoxymethylmelamine of trioxane and N-substituted oxymethylmelamines corresponding to the general formula:

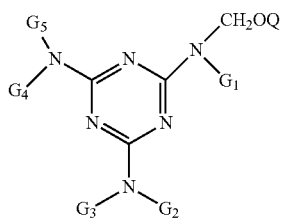

in which Q represents an alkyl group containing from 1 to 8 carbon atoms; $G_1$, $G_2$, $G_3$, $G_4$ and $G_5$ are selected, independently of one another, from the group consisting of a hydrogen atom, of an alkyl group containing 1 to 8 carbon atoms, of the —$CH_2OQ$ group and their condensation products. More advantageously, these other additional constituents are devoid of formaldehyde and devoid of the methylene donors described in this paragraph.

More preferably still, in the embodiment where the base constituents comprise other additional constituents, these other additional constituents are devoid of formaldehyde and/or devoid of methylene donor. More advantageously, these other additional constituents are devoid of formaldehyde and devoid of methylene donors.

Devoid of formaldehyde or devoid of methylene donor is understood to mean that the total content by weight of formaldehyde or of methylene donor(s) belonging to the groups described above, by total weight of the compound(s) in the base constituents, is less than or equal to 10%, preferably less than or equal to 5%, more preferably less than or equal to 2% and more preferably still less than or equal to 1%.

Devoid of formaldehyde and devoid of methylene donor is understood to mean that the total content by weight of formaldehyde and of methylene donor(s) belonging to the groups described above, by total weight of the compound(s) in the base constituents, is less than or equal to 10%, preferably less than or equal to 5%, more preferably less than or equal to 2% and more preferably still less than or equal to 1%.

Thus, the resins described above are based on compounds which comply with the regulations targeted at at excluding certain compounds, such as formaldehyde. In addition, formaldehyde is a compound derived from oil, the use of which it is desired to avoid as much as possible for reasons of increased scarcity.

Drying Agent

Advantageously, the process is such that, during the stage of manufacture of the composition, a drying agent is added.

Preferably, the drying agent is chosen from kaolin, montmorillonite, mica, magnesium sulfate, magnesium chloride and the mixture of these drying agents.

In the case where a release of water occurs, during the reaction between the compounds, a drying agent is introduced which has the aim of capturing this water.

The addition of this drying agent can in particular make it possible to adjust the mechanical properties of the resin.

Additives

The composition of the process of the invention can, of course, comprise all or part of the usual additives for compositions, such as those used to form products reinforced by reinforcing elements; mention will be made, for example, of fillers, colourants, antioxidants or other stabilizers.

Advantageously, the filler is chosen from carbon black and silica.

Compounds A1, A2, A3, A4, A5 or A6

At least one base constituent of the resin is a compound A1, A2, A3, A4, A5 or A6, this compound A1, A2, A3, A4, A5 or A6 being chosen from:

a compound A11 comprising at least one aromatic nucleus bearing at least two functional groups, one of these functional groups being a hydroxymethyl functional group and the other being an aldehyde functional group or a hydroxymethyl functional group, or a compound A12 comprising at least one aromatic nucleus bearing at least one aldehyde functional group, or a mixture of a compound A11 and of a compound A12.

In a first embodiment, the compound A12 comprises at least one aromatic nucleus bearing at least one aldehyde functional group.

More preferentially, the compound A12 bears at least two aldehyde functional groups.

More preferentially still, the aromatic nucleus of the compound A12 bears two aldehyde functional groups.

In one embodiment, the aromatic nucleus of the compound A12 is selected from the group consisting of a benzene nucleus and a furan nucleus; preferably, the aromatic nucleus of the aromatic aldehyde is a benzene nucleus.

Preferably, the compound A12 is selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and the mixtures of these compounds.

In the first embodiment, the compound A12 is, in an alternative form, of general formula (A):

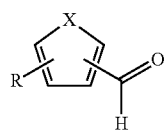
(A)

in which:

X comprises N, S or O,

R represents —H or —CHO.

Preferentially, the compound A12 is of general formula (A'):

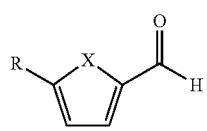
(A')

More preferentially still, R represents —CHO.

According to a preferred embodiment, X represents O.

In an alternative form of the compound A12 of general formula (A), X represents O and R represents —H. The compound A12 used is then of formula (Ba):

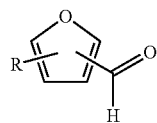
(Ba)

In an alternative form of the compound A12 of general formula (A'), X represents O and R represents —H. The compound A12 used is then furfuraldehyde and is of formula (B'a):

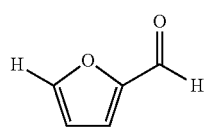
(B'a)

In another alternative form of the compound A12 of general formula (A), X represents O and R represents —CHO. The compound A12 used is then of formula (Bb):

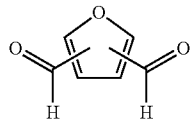
(Bb)

In another alternative form of the compound A12 of general formula (A'), X represents O and R represents —CHO. The compound A12 used is then 2,5-furandicarboxaldehyde and is of formula (B'b):

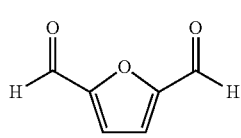
(B'b)

In another embodiment, X comprises N.

Preferably, the compound A12 is selected from the group consisting of furfuraldehyde, 2,5-furandicarboxaldehyde and the mixtures of these compounds.

In an alternative form of the compound A12 of general formula (A), X represents NH. The compound A12 used is of formula (Ca):

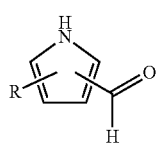
(Ca)

In an alternative form of the compound A12 of general formula (A'), X represents NH. The compound A12 used is of formula (C'a):

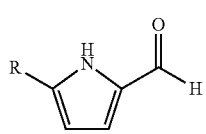
(C'a)

Preferably, R represents —CHO in the alternative form of the compound A12 of formula (C'a) and the compound A12 obtained is then 1H-pyrrole-2,5-dicarboxaldehyde.

In another alternative form of the compound A12 of general formula (A), X represents $NT_1$ with $T_1$ representing an alkyl, aryl, arylalkyl, alkylaryl or cycloalkyl group. The compound A12 used is of formula (Cb):

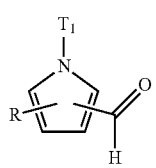
(Cb)

In another embodiment, X comprises S.

In an alternative form of the compound A12 of general formula (A), X represents S. The compound A12 used is of formula (Da):

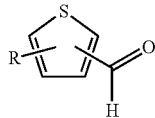

(Da)

In an alternative form of the compound A12 of general formula (A'), X represents S. The compound A12 used is of formula (D'a):

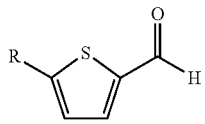

(D'a)

Preferably, R represents —CHO in the alternative form of the compound A12 of formula (IV'a) and is then 2,5-thiophenedicarboxaldehyde.

In another alternative form of the compound A12 of general formula (A), X represents $ST_2$ with $T_2$ representing an alkyl, aryl, arylalkyl, alkylaryl or cycloalkyl group. The compound A12 used is of formula (Db):

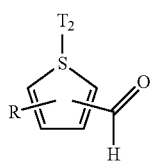

(Db)

In yet another alternative form of the compound A12 of general formula (A), X represents $T_3$-S-$T_2$ with $T_2$ and $T_3$ each representing, independently of each other, an alkyl, aryl, arylalkyl, alkylaryl or cycloalkyl group. The compound A12 used is of formula (Dc):

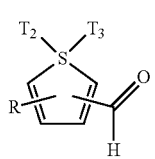

(Dc)

In yet another alternative form of the compound A12 of general formula (A), X represents S=O. The compound A12 used is of formula (Dd):

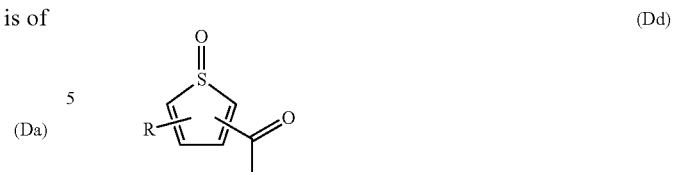

(Dd)

In yet another alternative form of the compound A12 of general formula (A), X represents O=S=O. The compound A12 used is of formula (De):

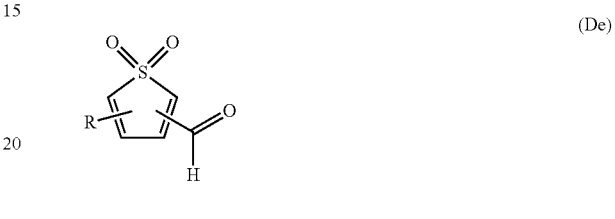

(De)

Among the various embodiments described above, preference will be given to the embodiments and alternative forms in which X represents NH, S or O. In these embodiments and alternative forms, it will be possible to have R representing —H or —CHO and preferably R representing —CHO. In these embodiments and alternative forms, R will preferentially be in the 5 position and the —CHO group will preferentially be in the 2 position on the aromatic nucleus (general formula (A')).

In a second embodiment, the compound A11 is an aromatic compound comprising at least one aromatic nucleus bearing at least two functional groups, one of these functional groups being a hydroxymethyl functional group and the other being an aldehyde functional group or a hydroxymethyl functional group.

Thus, in this second embodiment, it is said aromatic nucleus which bears the hydroxymethyl and aldehyde functional groups. The compound A11 thus corresponds, in this second embodiment, to the general formula (I):

$$HO—CH_2—Ar—B \quad (I)$$

in which Ar represents an aromatic nucleus and B represents CHO or $CH_2OH$.

The aromatic nucleus is advantageously a 5- or 6-membered nucleus comprising, as ring members, carbon atoms and optionally one or more heteroatoms, in particular nitrogen, oxygen or sulfur atoms, optionally oxidized in the N-oxide or S-oxide form. In one alternative form, the aromatic nucleus comprises 0, 1 or 2 heteroatom(s). The remainder of the aromatic nucleus can be substituted or unsubstituted.

The aromatic nucleus can bear 0, 1 or 2 aldehyde functional groups, advantageously 0 or 1 aldehyde functional group.

The aromatic nucleus can bear 1, 2 or 3 hydroxymethyl functional groups, advantageously 1 or 2 hydroxymethyl functional groups.

In addition, the aromatic nucleus can also bear 0, 1 or 2 other functional group(s), in particular hydroxyl functional group(s).

In the embodiment in which the aromatic nucleus is a 6-membered nucleus, the B and hydroxymethyl functional groups are advantageously in the meta or para position with respect to each other.

In the embodiment in which the aromatic nucleus is a 5-membered nucleus, the nucleus can comprise one or more heteroatoms, in particular nitrogen, oxygen or sulfur atoms, optionally oxidized in the N-oxide or S-oxide form. Advantageously, the aromatic nucleus comprises 1 or 2 heteroatom(s), preferably 1 heteroatom.

In this embodiment, in which the aromatic nucleus is a 5-membered nucleus, at least one of the following three conditions is observed:
- the aromatic nucleus comprises 0 or a single aldehyde functional group;
- the aromatic nucleus comprises one or two hydroxymethyl functional groups;
- apart from the aldehyde and hydroxymethyl functional groups, the remainder of the aromatic nucleus is unsubstituted.

Advantageously, these three conditions are observed.
In a first case, the aromatic nucleus comprises:
a single aldehyde functional group;
a single hydroxymethyl functional group;
apart from the aldehyde and hydroxymethyl functional groups, the remainder of the aromatic nucleus is unsubstituted.

In a second case, the aromatic nucleus comprises:
0 aldehyde functional group;
two hydroxymethyl functional groups;
apart from the hydroxymethyl functional groups, the remainder of the aromatic nucleus is unsubstituted.

Advantageously, the compound A11 corresponds to the general formula (II):

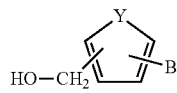

(II)

in which B represents CHO or CH$_2$OH, Y represents O, NR$_1$, NO, S, SO, SO$_2$ or SR$_2$R$_3$, R$_1$ represents a hydrogen or an alkyl, aryl, arylalkyl, alkylaryl or cycloalkyl group and R$_2$ and R$_3$ each represent, independently of each other, a hydrogen or an alkyl, aryl, arylalkyl, alkylaryl or cycloalkyl group.

Advantageously, the compound A11 is of general formula (II'):

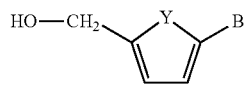

(II')

in which Y and B are as defined above.

In a particularly advantageous embodiment, B represents CHO. In another embodiment, B represents CH$_2$OH.

According to a preferential embodiment, Y represents O.

In an alternative form, the compound A11 is of formula (IIa):

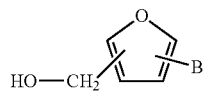

(IIa)

B being as defined above, and more particularly the compound A11 corresponds to the general formula (II'a1) or (II'a2):

(II'a1)

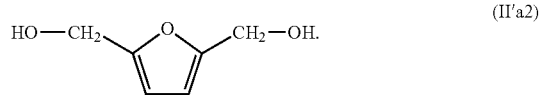

(II'a2)

5-(Hydroxymethyl)furfural (II'a1) is a particularly suitable compound A11, given that this organic compound can readily result from renewable resources. Specifically, it results in particular from the dehydration of certain sugars, such as fructose, glucose, sucrose, cellulose and insulin.

In another embodiment, Y represents NR$_1$ or NO, advantageously NR$_1$. R$_1$ represents a hydrogen or an alkyl, aryl, arylalkyl, alkylaryl or cycloalkyl group.

In an alternative form, the compound is of formula (IIb):

(IIb)

B being as defined above,
and more particularly of formula (II'b1) or (II'b2):

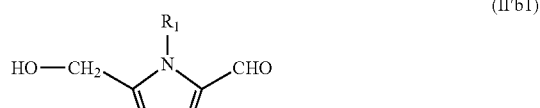

(II'b1)

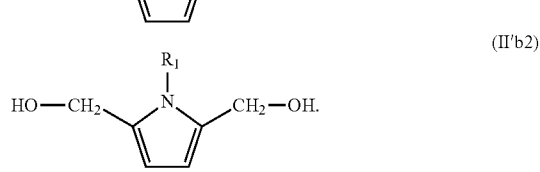

(II'b2)

in which R$_1$ is as defined above. Advantageously, R$_1$ represents a hydrogen or a C$_1$-C$_6$ alkyl group.

In another embodiment, Y represents S, SO, SO$_2$ or SR$_2$R$_3$ with R$_2$ and R$_3$ as defined above.

In an alternative form, the compound is of formula (IIc): B being as defined above

(IIc)

with Y representing S, SR$_2$R$_3$, SO or SO$_2$ and R$_2$ and R$_3$ each representing, independently of each other, a hydrogen or an alkyl, aryl, arylalkyl, alkylaryl or cycloalkyl group, B, R$_2$ and R$_3$ being as defined above; and more particularly of formula (II'1) or (II'c2):

(II'c1) HO—CH₂—[ring with Y]—CHO (II'c2) HO—CH₂—[ring with Y]—CH₂—OH in which Y represents S, SR₂R₃, SO or SO₂ and R₂ and R₃ each represent, independently of each other, a hydrogen or an alkyl, aryl, arylalkyl, alkylaryl or cycloalkyl group.

The compound can thus be:

(II'c3) HO—CH₂—[thiophene ring with S]—CHO (II'c4) HO—CH₂—[thiophene ring with S]—CH₂OH (II'c5) HO—CH₂—[thiophene ring with S=O]—CHO (II'c6) HO—CH₂—[thiophene ring with S=O]—CH₂OH (II'c7) HO—CH₂—[thiophene ring with SR₂R₃]—CHO (II'c8) HO—CH₂—[thiophene ring with SR₂R₃]—CH₂OH (II'c9) HO—CH₂—[thiophene ring with SO₂]—CHO (II'c10) HO—CH₂—[thiophene ring with SO₂]—CH₂OH Advantageously, R₂ and R₃ each represent, independently of each other, a $C_1$-$C_6$ alkyl radical.

The compound is advantageously of formula (II'c3) or (II'c4).

In another alternative form, the aromatic nucleus is a 6-membered nucleus, which can comprise 0, one or several heteroatoms, in particular nitrogen heteroatoms, optionally oxidized in the N-oxide form. In an alternative form, the aromatic nucleus comprises 0, 1 or 2 heteroatom(s).

The B and hydroxymethyl functional groups are advantageously in the meta or para position with respect to each other.

The aromatic nucleus can bear 0, 1 or 2 aldehyde functional groups, advantageously 0 or 1 aldehyde functional group.

The aromatic nucleus can bear 1, 2 or 3 hydroxymethyl functional groups, advantageously 1 or 2 hydroxymethyl functional groups.

In addition, the aromatic nucleus can also bear 0, 1 or 2 other functional group(s), in particular hydroxyl functional group(s).

Advantageously, compound A11 is of general formula (III):

(III) (HO—H₂C)ₚ—[benzene ring with Y]—(CHO)ₙ, (OH)ₘ in which Y represents C or NR₁, n has the value 0, 1 or 2, m has the value 0 or 1 and p has the value 1, 2 or 3. R₁ represents a hydrogen or an alkyl, aryl, arylalkyl, alkylaryl or cycloalkyl group. Thus, p+n>1 with p>0.

Advantageously, R₁ represents a hydrogen or a $C_1$-$C_6$ alkyl group.

In an alternative form, n has the value 1, m has the value 0 and p has the value 1.

In another alternative form, n has the value 1, m has the value 1 and p has the value 1.

In another alternative form, n has the value 2, m has the value 1 and p has the value 1.

In another alternative form, n has the value 1, m has the value 1 and p has the value 2.

In another alternative form, n has the value 0, m has the value 0 and p has the value 2.

In another alternative form, n has the value 0, m has the value 1 and p has the value 2.

In another alternative form, n has the value 1, m has the value 1 and p has the value 2.

In another alternative form, n has the value 0, m has the value 1 and p has the value 3.

Preferentially, the aromatic nucleus of the compound A11 is a benzene nucleus. More preferentially, this aldehyde is selected from the group consisting of 2-(hydroxymethyl)benzene-1-carboxaldehyde, 3-(hydroxymethyl)benzene-1-carboxaldehyde, 4-(hydroxymethyl)benzene-1-carboxaldehyde, 3-hydroxymethyl-6-hydroxybenzene-1-carboxaldehyde, 3-hydroxymethyl-4-hydroxybenzene-1-carboxaldehyde, 3-hydroxymethyl-2-hydroxybenzene-1-carboxaldehyde, 3-hydroxymethyl-2-hydroxybenzene-1,5-dicarboxaldehyde, 5-hydroxymethyl-2-hydroxybenzene-1,3-dicarboxaldehyde, 3,5-di(hydroxymethyl)-4-hydroxybenzene-1-carboxaldehyde, 3,5-di(hydroxymethyl)-2-hydroxybenzene-1-carboxaldehyde, 1,2-di(hydroxymethyl)benzene, 1,3-di(hydroxymethyl)benzene, 1,4-di(hydroxymethyl)benzene, 1,3-di(hydroxymethyl)-6-hydroxybenzene, 1,3-di(hydroxymethyl)-4-hydroxybenzene, 1,3-di(hydroxymethyl)-2-hydroxybenzene, 1,3,5-tri(hydroxymethyl)-2-hydroxybenzene, 1,3-di(hydroxymethyl)-6-hydroxybenzene, 1,3,5-tri(hydroxymethyl)-4-hydroxybenzene, 1,3,2-tri(hydroxymethyl)-2-hydroxybenzene and the mixtures of these compounds.

More preferentially still, the compound A11 used is 1-(hydroxymethyl)benzene-4-carboxaldehyde of formula (IIIa) or 1,4-di(hydroxymethyl)benzene of formula (IIIb):

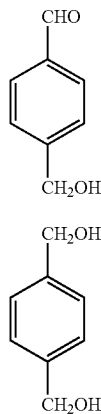

Among the other advantages related to the use of the compounds A11 and/or A12, it should be noted that the composition can be devoid of formaldehyde, the use of which it is desirable to reduce, indeed even eventually to eliminate, in adhesive compositions, due to the recent change in European regulations regarding this type of compound. In addition, formaldehyde is a compound derived from oil, the use of which it is desired to avoid as much as possible for reasons of increased scarcity.

Compound A1, A2, A3, A4, A5 or A6

At least one base constituent of the resin is a compound A1, A2, A3, A4, A5 or A6.

Advantageously, this compound A1, A2, A3, A4, A5 or A6 is a phenol.

Advantageously, the phenol is chosen from:
an aromatic polyphenol A21 comprising at least one aromatic nucleus bearing at least two hydroxyl functional groups in the meta position with respect to each other, the two positions ortho to at least one of the hydroxyl functional groups being unsubstituted,
an aromatic monophenol A22 comprising at least one six-membered aromatic nucleus bearing a single hydroxyl functional group,
 the two positions ortho to the hydroxyl functional group being unsubstituted, or
 at least one position ortho to and the position para to the hydroxyl functional group being unsubstituted,
a mixture of A21 and A22.

In one embodiment, the phenol is an aromatic polyphenol A21 comprising one or more aromatic nucleus/nuclei. The aromatic polyphenol comprises at least one aromatic nucleus bearing at least two hydroxyl functional groups in the meta position with respect to each other, the two positions ortho to at least one of the hydroxyl functional groups being unsubstituted.

In another embodiment, the phenol is an aromatic monophenol A22 comprising at least one six-membered aromatic nucleus bearing a single hydroxyl functional group. On this aromatic monophenol, the two positions ortho to the hydroxyl functional group are unsubstituted, or else at least one position ortho to and the position para to the hydroxyl functional group are unsubstituted.

In yet another embodiment, the phenol is a mixture of the aromatic polyphenol A21 and of the aromatic monophenol A22 as are described above.

In accordance with the invention, the aromatic polyphenol A21 can be, in one embodiment, a simple aromatic polyphenol molecule comprising one or more aromatic nuclei, at least one of these aromatic nuclei, indeed even each aromatic nucleus, bearing at least two hydroxyl functional groups in the meta position with respect to each other, the two positions ortho to at least one of the hydroxyl functional groups being unsubstituted.

Similarly, the aromatic monophenol A22 can be, in one embodiment, a simple aromatic monophenol molecule comprising one or more six-membered aromatic nuclei, at least one of these six-membered aromatic nuclei, indeed even each six-membered aromatic nucleus, bearing a single hydroxyl functional group, the two positions ortho to the hydroxyl functional group being unsubstituted, or else at least one position ortho to and the position para to the hydroxyl functional group being unsubstituted.

Such simple molecules do not comprise a repeat unit.

In accordance with the invention, the aromatic polyphenol A21 can, in another embodiment, be a precondensed resin based on:
at least one aromatic polyphenol comprising at least one aromatic nucleus bearing at least two hydroxyl functional groups in the meta position with respect to each other, the two positions ortho to at least one of the hydroxyl functional groups being unsubstituted; and
at least one compound comprising at least one aldehyde functional group and/or at least one compound comprising at least two hydroxymethyl functional groups borne by an aromatic nucleus.

Such a precondensed resin based on aromatic polyphenol is in accordance with the invention and comprises, unlike the simple molecule described above, a repeat unit. In the case in point, the repeat unit comprises at least one aromatic nucleus bearing at least two hydroxyl functional groups in the meta position with respect to each other.

Similarly and in accordance with the invention, the aromatic monophenol A22 can, in another embodiment, be a precondensed resin based on:
at least one aromatic monophenol comprising at least one six-membered aromatic nucleus bearing a single hydroxyl functional group:
 the two positions ortho to the hydroxyl functional group are unsubstituted, or
 at least one position ortho to and the position para to the hydroxyl functional group are unsubstituted;
at least one compound comprising at least one aldehyde functional group and/or at least one compound comprising at least two hydroxymethyl functional groups borne by an aromatic nucleus.

Such a precondensed resin based on aromatic monophenol is in accordance with the invention and comprises, unlike the simple molecule described above, a repeat unit. In the case in point, the repeat unit comprises at least one six-membered aromatic nucleus bearing a single hydroxyl functional group.

In another embodiment, the phenol is a mixture of an aromatic polyphenol which forms a simple molecule and of a precondensed resin based on aromatic polyphenol.

In yet another embodiment, the phenol is a mixture of an aromatic monophenol which forms a simple molecule and of a precondensed resin based on aromatic monophenol.

In the specific embodiments which follow, the aromatic nucleus or nuclei of the aromatic polyphenol and/or of the aromatic monophenol are described. For the sake of clarity, the "aromatic polyphenol" and/or the "aromatic monophenol" is described therein in its simple molecule form. This aromatic polyphenol and/or this aromatic monophenol will subsequently be able to be condensed and will in part define the repeat unit. The characteristics of the precondensed resin are described in more detail subsequently.

Aromatic Polyphenol A21

In a preferred embodiment, the aromatic nucleus of the aromatic polyphenol bears three hydroxyl functional groups in the meta position with respect to one another.

Preferably, the two positions ortho to each hydroxyl functional group are unsubstituted. This is understood to mean that the two carbon atoms located on either side of (in the position ortho to) the hydroxylated carbon atom (i.e., the carbon atom bearing the hydroxyl functional group) bear a simple hydrogen atom.

More preferentially still, the remainder of the aromatic nucleus of the aromatic polyphenol is unsubstituted. This is understood to mean that the other carbon atoms of the remainder of the aromatic nucleus (those other than the carbon atoms bearing the hydroxyl functional groups) bear a simple hydrogen atom.

In one embodiment, the aromatic polyphenol comprises several aromatic nuclei, at least two of them each bearing at least two hydroxyl functional groups in the meta position with respect to each other, the two positions ortho to at least one of the hydroxyl functional groups of at least one aromatic nucleus being unsubstituted.

In a preferred embodiment, at least one of the aromatic nuclei of the aromatic polyphenol bears three hydroxyl functional groups in the meta position with respect to each other.

Preferably, the two positions ortho to each hydroxyl functional group of at least one aromatic nucleus are unsubstituted.

More preferentially still, the two positions ortho to each hydroxyl functional group of each aromatic nucleus are unsubstituted.

Advantageously, the or each aromatic nucleus of the aromatic polyphenol is a benzene nucleus.

Mention may in particular be made, as example of aromatic polyphenol comprising just one aromatic nucleus, of resorcinol and phloroglucinol, as a reminder of expanded formulae (IV) and (V) respectively:

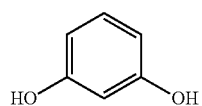

(IV)

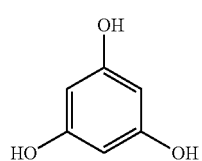

(V)

By way of examples, in the case where the aromatic polyphenol comprises several aromatic nuclei, at least two of these aromatic nuclei, which are identical or different, are chosen from those of general formulae:

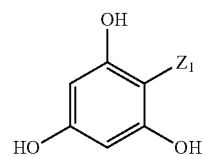

(VI-a)

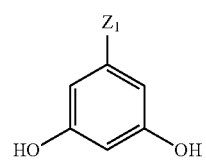

(VI-b)

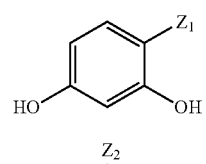

(VI-c)

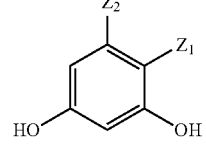

(VI-d)

in which the symbols $Z_1$ and $Z_2$, which are identical or different, if there are several of them on the same aromatic nucleus, represent an atom (for example, carbon, sulfur or oxygen) or a bonding group, by definition at least divalent, which connects at least these two aromatic nuclei to the remainder of the aromatic polyphenol.

Another example of aromatic polyphenol is 2,2',4,4'-tetrahydroxydiphenyl sulfide of following expanded formula (VII):

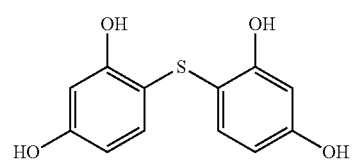

(VII)

Another example of aromatic polyphenol is 2,2',4,4'-tetrahydroxybenzophenone of following expanded formula (VIII):

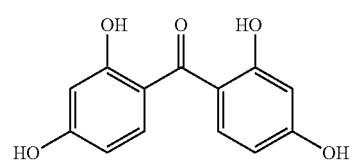

(VIII)

It is noted that each compound VII and VIII is an aromatic polyphenol comprising two aromatic nuclei (of formulae VI-c), each of which bears at least two (in this case two) hydroxyl functional groups in the meta position with respect to each other.

It is noted, in the case of an aromatic polyphenol comprising at least one aromatic nucleus in accordance with the formula VI-b, that the two positions ortho to each hydroxyl functional group of at least one aromatic nucleus are unsubstituted. In the case of an aromatic polyphenol comprising several aromatic nuclei in accordance with the formula VI-b, the two positions ortho to each hydroxyl functional group of each aromatic nucleus are unsubstituted.

According to one embodiment of the invention, the aromatic polyphenol is selected from the group consisting of resorcinol (IV), phloroglucinol (V), 2,2',4,4'-tetrahydroxydiphenyl sulfide (VII), 2,2',4,4'-tetrahydroxybenzophenone (VIII) and the mixtures of these compounds. In a particularly advantageous embodiment, the aromatic polyphenol is phloroglucinol.

In one embodiment, the aromatic polyphenol A21 comprises a precondensed resin based on the aromatic polyphenol as described in any one of these embodiments.

This precondensed resin is advantageously based on:
at least one aromatic polyphenol as defined above, and preferentially selected from the group consisting of resorcinol, phloroglucinol, 2,2',4,4'-tetrahydroxydiphenyl sulfide, 2,2',4,4'-tetrahydroxybenzophenone and their mixtures; and
at least one compound capable of reacting with the aromatic polyphenol comprising at least one aldehyde functional group and/or at least one compound capable of reacting with the aromatic polyphenol comprising at least two hydroxymethyl functional groups, and preferentially an aromatic aldehyde comprising at least one aromatic nucleus bearing at least one aldehyde functional group.

The compound capable of reacting with the aromatic polyphenol can be a compound A1, A3 or A5 as defined above or any other aldehyde. Advantageously, said compound is selected from the group consisting of an aromatic compound comprising an aromatic nucleus bearing at least two functional groups, one of these functional groups being a hydroxymethyl functional group and the other being an aldehyde functional group or a hydroxymethyl functional group, formaldehyde, furfuraldehyde, 2,5-furandicarboxaldehyde, 1,4-benzenedicarboxaldehyde, 1,3-benzenedicarboxaldehyde, 1,2-benzenedicarboxaldehyde and the mixtures of these compounds. Very advantageously, when the compound capable of reacting with the aromatic polyphenol is an aromatic compound comprising an aromatic nucleus bearing at least two functional groups, one of these functional groups being a hydroxymethyl functional group and the other being an aldehyde functional group or a hydroxymethyl functional group, this compound is selected from the group consisting of 5-(hydroxymethyl)furfural, 2,5-di(hydroxymethyl)furan and the mixtures of these compounds.

Thus, in the precondensed resin based on aromatic polyphenol, the repeat unit corresponds to the characteristics of the aromatic polyphenol which are defined above, except that at least one of the carbon atoms of the aromatic nucleus, which was unsubstituted, is connected to another unit.

Whatever the compound other than the aromatic polyphenol which is the basis of the precondensed resin, this precondensed resin is devoid of free formaldehyde. This is because, even in the case where the precondensed resin is based on an aromatic polyphenol as described above and on formaldehyde, as the formaldehyde has already reacted with the aromatic polyphenol, the precondensed resin is devoid of free formaldehyde liable to be able to react with a compound A1 in accordance with the invention in a subsequent stage.

The aromatic polyphenol A21 can also comprise a mixture of a free aromatic polyphenol molecule and of a precondensed resin based on aromatic polyphenol, as described above. In particular, the aromatic polyphenol A21 can also comprise a mixture of phloroglucinol and of a precondensed resin based on phloroglucinol.

Aromatic Monophenol A22

The aromatic monophenol A22 can be in accordance with two alternative forms. In one alternative form, the two positions ortho to the hydroxyl functional group are unsubstituted. In another alternative form, at least one position ortho to and the position para to the hydroxyl functional group are unsubstituted.

Advantageously, in the alternative form in which at least one position ortho to and the position para to the hydroxyl functional group are unsubstituted, a single ortho position is unsubstituted and the position para to the hydroxyl functional group is unsubstituted.

Preferably, whatever the alternative form, the two positions ortho to the hydroxyl functional group are unsubstituted. This is understood to mean that the two carbon atoms located on either side of (in the position ortho to) the hydroxylated carbon atom (i.e., the carbon atom bearing the hydroxyl functional group) bear a simple hydrogen atom.

More preferentially still, the remainder of the aromatic nucleus is unsubstituted. This is understood to mean that the other carbon atoms of the remainder of the aromatic nucleus (those other than the carbon atoms bearing the hydroxyl functional groups) bear a simple hydrogen atom.

In one embodiment, the aromatic monophenol comprises several six-membered aromatic nuclei, at least two of them each bearing a single hydroxyl functional group and, for at least one of the hydroxyl functional groups, the two positions ortho to the hydroxyl functional group are unsubstituted or at least one position ortho to and the position para to the hydroxyl functional group are unsubstituted.

Preferably, the two positions ortho to each hydroxyl functional group of at least one six-membered aromatic nucleus are unsubstituted.

More preferentially still, the two positions ortho to each hydroxyl functional group of each six-membered aromatic nucleus are unsubstituted.

More preferentially still, the remainder of each of the aromatic nuclei is unsubstituted. This is understood to mean that the other carbon atoms of the remainder of each aromatic nucleus (those other than the carbon atoms bearing the hydroxyl functional groups or bearing the group which connects the aromatic nuclei together) bear a simple hydrogen atom.

Advantageously, the or each aromatic nucleus of the aromatic monophenol is a benzene nucleus.

Preferably, the aromatic monophenol is selected from the group consisting of phenol, ortho-cresol, meta-cresol, para-cresol, ortho-chlorophenol, meta-chlorophenol, para-chlorophenol, 2-hydroxybenzoic acid, 3-hydroxybenzoic acid, 4-hydroxybenzoic acid, 4-vinylphenol, 4-ethylphenol, 4-isopropylphenol, 4-isobutylphenol, para-coumaric acid and the mixtures of these compounds.

In one embodiment, the aromatic monophenol A22 comprises a precondensed resin based on the aromatic monophenol as described in any one of these embodiments.

This precondensed resin is advantageously based on:
at least one aromatic monophenol as defined above, and preferentially selected from the group consisting of phenol, ortho-cresol, meta-cresol, para-cresol, ortho-chlorophenol, meta-chlorophenol, para-chlorophenol, 2-hydroxybenzoic acid, 3-hydroxybenzoic acid, 4-hydroxybenzoic acid, 4-vinylphenol, 4-ethylphenol, 4-isopropylphenol, 4-isobutylphenol, para-coumaric acid and the mixtures of these compounds; and at least one compound capable of reacting with the aromatic monophenol comprising at least one aldehyde functional group and/or at least one compound capable of reacting with the aromatic monophenol comprising at least two hydroxymethyl functional groups, and preferentially an aromatic aldehyde comprising at least one aromatic nucleus bearing at least one aldehyde functional group.

The compound capable of reacting with the aromatic monophenol can be a compound A1, A3 or A5 as defined above or any other aldehyde. Advantageously, said compound capable of reacting with the aromatic monophenol is selected from the group consisting of an aromatic compound comprising an aromatic nucleus bearing at least two functional groups, one of these functional groups being a hydroxymethyl functional group and the other being an aldehyde functional group or a hydroxymethyl functional group, formaldehyde, furfuraldehyde, 2,5-furandicarboxaldehyde, 1,4-benzenedicarboxaldehyde, 1,3-benzenedicarboxaldehyde, 1,2-benzenedicarboxaldehyde and the mixtures of these compounds. Very advantageously, when the compound is an aromatic compound comprising an aromatic nucleus bearing at least two functional groups, one of these functional groups being a hydroxymethyl functional group and the other being an aldehyde functional group or a hydroxymethyl functional group, this compound is selected from the group consisting of 5-(hydroxymethyl)furfural, 2,5-di(hydroxymethyl)furan and the mixtures of these compounds.

Thus, in the precondensed resin based on aromatic monophenol, the repeat unit corresponds to the characteristics of the aromatic monophenol which are defined above, except that at least one of the carbon atoms of the six-membered aromatic nucleus, which was unsubstituted, is connected to another unit.

Whatever the compound other than the aromatic monophenol which is the basis of the precondensed resin, this precondensed resin is devoid of free formaldehyde. This is because, even in the case where the precondensed resin is based on an aromatic monophenol as described above and on formaldehyde, as the formaldehyde has already reacted with the aromatic monophenol, the precondensed resin is devoid of free formaldehyde liable to be able to react with a compound A1, A3 or A5 in accordance with the invention in a subsequent stage.

The aromatic monophenol A22 can also comprise a mixture of a free aromatic monophenol molecule and of a precondensed resin based on aromatic monophenol, as described above. In particular, the aromatic monophenol A22 can also comprise a mixture of phenol and of a precondensed resin based on phenol.

Mixture of Aromatic Polyphenol A21 and of Aromatic Monophenol A22

The phenol can also comprise a mixture of an aromatic polyphenol A21 and of an aromatic monophenol A22, as described above.

Preferably, the phenol comprises a mixture of aromatic polyphenol and of a precondensed resin based on aromatic polyphenol.

Reinforced Product According to the Invention

The invention also relates to a product reinforced by at least one reinforcing element capable of being obtained by the process as defined above.

Advantageously, the reinforced product comprises one or more reinforcing elements embedded in the matrix based on the composition according to the invention, and, in the case of several reinforcing elements, the reinforcing elements are arranged side by side along a main direction. Each reinforcing element comprises at least one threadlike element and can, in some embodiments, comprise several threadlike elements.

In one embodiment, the reinforcing element can comprise a threadlike element and optionally a sheath individually coating the threadlike element or collectively coating several threadlike elements. The sheath can comprise one or more layers, each layer being based on a polymeric composition, for example as described in WO2010/136389, WO2010/105975, WO2011/012521, WO2011/051204, WO2012/016757, WO2012/038340, WO2012/038341, WO2012/069346, WO2012/104279, WO2012/104280 and WO2012/104281.

Threadlike element is understood to mean an element exhibiting a length at least 10 times greater than the greatest dimension of its section, whatever the shape of the latter: circular, elliptical, oblong, polygonal, in particular rectangular or square or oval. In the case of a rectangular section, the threadlike element exhibits the shape of a band.

In another embodiment, the reinforcing element can be a knitted fabric or a woven fabric.

A knitted fabric is an assembly of threadlike elements as are defined above and comprising meshes formed by one or more of these threadlike elements. Each mesh comprises a loop interlaced with another loop. Mention may be made, for example, of knitted fabrics with a jersey or English rib structure for weft-knitted fabrics and knitted fabrics with a locknit or atlas structure for warp-knitted fabrics.

A woven fabric is an assembly of a first family of threadlike elements, known as warp threadlike elements, substantially parallel to one another, and of a second family of threadlike elements, known as weft threadlike elements, substantially parallel to one another. Preferably, the threadlike elements of the first family are substantially perpendicular to the threadlike elements of the second family.

The threadlike element can be metallic or textile.

A metallic threadlike element can be a metallic individual monofilament. Such a metallic individual monofilament comprises a steel core, optionally coated with one or more layers of a coating which can be metallic and/or based on a non-metallic adhesive composition.

The metallic coating comprises a metal chosen from zinc, copper, tin, cobalt and the alloys of these metals. Mention will be made, as examples of alloys of these metals, of brass and bronze. The steel of the core is a carbon steel comprising between 0.1% and 1.2% by weight of carbon, at most 11% by weight of chromium and less than 1% by weight of each of the following elements: manganese, silicon, aluminium, boron, cobalt, copper, molybdenum, nickel, niobium, titanium, tungsten, vanadium, zirconium, phosphorus, sulfur and nitrogen, the remainder being made up of iron and unavoidable impurities resulting from the preparation. The steel can have a pearlitic, ferritic, austenitic, bainitic or martensitic microstructure or a microstructure resulting from a mixture of these microstructures.

The metallic individual monofilament exhibits a mechanical strength ranging from 1000 MPa to 5000 MPa. Such mechanical strengths correspond to the grades of steel commonly encountered in the tyre field, namely the NT (Normal Tensile), HT (High Tensile), ST (Super Tensile), SHT (Super High Tensile), UT (Ultra Tensile), UHT (Ultra High Tensile) and MT (Mega Tensile) grades, the use of high mechanical strengths optionally making possible an improved reinforcement of the matrix in which the reinforcing element is intended to be embedded and a lightening of the matrix thus reinforced.

In the case where the metallic individual monofilament exhibits a circular section, the diameter of these metallic individual monofilaments preferentially ranges from 0.05 mm to 0.50 mm.

A metallic threadlike element can be an assembly of several metallic individual monofilaments as are described above, assembled together in a helix, for example by cabling or twisting the metallic individual monofilaments in order to form, for example, layered cords comprising several concentric layers of metallic individual monofilaments or strand cords, each strand comprising several concentric layers of metallic individual monofilaments. Optionally and as described in WO2005071157, such a metallic threadlike element comprises a layer based on a polymer composition, preferably a composition comprising an elastomer, this layer being positioned between two layers of metallic individual monofilaments of the layered cord or of a strand of the strand cord.

A textile threadlike element can be a textile individual monofilament optionally coated with one or more layers of a coating based on a non-metallic adhesive composition. This textile individual monofilament is obtained, for example, by melt spinning, solution spinning or gel spinning. Each textile individual monofilament is made from an organic material, in particular polymeric material, or inorganic material, such as, for example, glass or carbon. The polymeric materials can be of the thermoplastic type, such as, for example, aliphatic polyamides, in particular polyamides 6-6, and polyesters, in particular polyethylene terephthalate. The polymeric materials can be of the non-thermoplastic type, such as, for example, aromatic polyamides, in particular aramid, and cellulose, natural as well as artificial, in particular rayon. Each textile individual monofilament exhibits a substantially circular section exhibiting a diameter ranging, for example, from 2 µm to 100 µm.

A textile threadlike element can be an assembly of several textile individual monofilaments as are defined above, also known as yarn. A yarn preferably comprises more than 10 textile individual monofilaments, preferably more than 100 textile individual monofilaments and more preferentially more than 500 textile individual monofilaments.

A textile threadlike element can also be an assembly of several yarns as are defined above. In an alternative form, the materials from which the textile individual monofilaments of each yarn are made are identical. In another alternative form, the materials from which the textile individual monofilaments of each yarn are made are different, the textile threadlike element then being commonly known as hybrid textile threadlike element.

Whether in the case of a metallic or textile threadlike element, the layer based on a non-metallic adhesive composition is, in one embodiment, formed by a layer of an adhesion primer making it possible to improve the adhesion of the threadlike element, for example to an elastomeric matrix. Such adhesion primers are those commonly used by a person skilled in the art for the presizing of certain textile fibres (in particular fibres made of polyester, for example PET, of aramid or of aramid/nylon). For example, use could be made of an epoxy-based primer, in particular a primer based on polyglycerol polyglycidyl ether. Use could also be made of a primer based on blocked isocyanate.

Whether in the case of a metallic or textile threadlike element, the layer based on a non-metallic adhesive composition is, in another embodiment, formed by a layer based on a resin and on a latex of elastomer(s). Mention will be made of adhesive compositions of RFL (Resorcinol-Formaldehyde-Latex) type but also of the adhesive compositions as described in WO2015118041.

Whether in the case of a metallic or textile threadlike element, in yet another embodiment, it will be possible to have a layer of an adhesion primer coating the threadlike element, this layer of adhesion primer being itself coated with a layer based on a resin and on a latex of elastomer(s).

Composite According to the Invention

The invention also relates to an elastomer composite reinforced with at least one product reinforced by at least one reinforcing element as defined above. The elastomer matrix is based on an elastomer composition comprising at least one elastomer and another constituent.

This elastomer composite can be prepared according to a process comprising at least the following stages:
  during a first stage, combining at least one reinforced product with an elastomer composition in order to form an elastomer composite reinforced with the reinforced product;
  then, during a second stage, crosslinking by curing, for example by vulcanization, preferably under pressure, the composite thus formed.

Preferably, the elastomer composition comprises a diene elastomer. Elastomer or rubber (the two terms being synonyms) of the "diene" type is understood to mean, generally, an elastomer resulting, at least in part (i.e., a homopolymer or a copolymer), from diene monomers (monomers bearing two conjugated or non-conjugated carbon-carbon double bonds).

The elastomer compositions can contain just one diene elastomer or a mixture of several diene elastomers, it being possible for the diene elastomer(s) to be used in combination with any type of synthetic elastomer other than a diene elastomer, indeed even with polymers other than elastomers, for example thermoplastic polymers.

In a first embodiment preferentially intended for a tyre use, the elastomer composition comprises a diene elastomer selected from the group consisting of polybutadienes (BRs), natural rubber (NR), synthetic polyisoprenes (IRs), the various butadiene copolymers, the various isoprene copolymers and the mixtures of these elastomers.

Such copolymers are more preferentially selected from the group consisting of butadiene/styrene copolymers (SBRs), whether the latter are prepared by emulsion polymerization (ESBRs) or solution polymerization (SSBRs), isoprene/butadiene copolymers (BIRs), isoprene/styrene copolymers (SIRs) and isoprene/butadiene/styrene copolymers (SBIRs).

Advantageously, the elastomer of ethylene/α-olefin type is selected from the group consisting of ethylene/propylene copolymers (EPMs), ethylene/propylene/diene copolymers (EPDMs) and mixtures of these copolymers.

Preferably, the elastomer composition comprises a reinforcing filler.

When a reinforcing filler is used, use may be made of any type of reinforcing filler known for its abilities to reinforce an elastomer composition which can be used for the manufacture of tyres, for example an organic filler, such as carbon black, a reinforcing inorganic filler, such as silica, or else a blend of these two types of filler, in particular a blend of carbon black and silica.

Any carbon black conventionally used in tyres ("tyre-grade" blacks) is suitable as carbon blacks. Mention will more particularly be made, for example, of the reinforcing carbon blacks of the 100, 200 or 300 series (ASTM grades).

In the case of the use of carbon blacks with an isoprene elastomer, the carbon blacks might, for example, be already incorporated in the isoprene elastomer in the form of a masterbatch (see, for example, Applications WO 97/36724 and WO 99/16600).

Mention may made, as examples of organic fillers other than carbon blacks, of functionalized polyvinylaromatic organic fillers, as described in Applications WO-A-2006/069792 and WO-A-2006/069793.

The term "reinforcing inorganic filler" should be understood, in the present patent application, by definition, as meaning any inorganic or mineral filler, whatever its colour and its origin (natural or synthetic), also known as "white filler", "clear filler", indeed even "non-black filler", in contrast to carbon black, which is capable of reinforcing by itself alone, without means other than an intermediate coupling agent, an elastomer composition, in other words capable of replacing, in its reinforcing role, a conventional tyre-grade carbon black. Such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other suitable densified form. Of course, reinforcing inorganic filler is also understood to mean mixtures of different reinforcing inorganic fillers, in particular of highly dispersible siliceous and/or aluminous fillers as described below.

Mineral fillers of the siliceous type, especially silica ($SiO_2$), or of the aluminous type, especially alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Rhodia, the Hi-Sil EZ150G silica from PPG, the Zeopol 8715, 8745 and 8755 silicas from Huber or the silicas having a high specific surface as described in Application WO 03/16837.

Finally, a person skilled in the art will understand that, as filler equivalent to the reinforcing inorganic filler described in the present section, use might be made of a reinforcing filler of another nature, in particular organic nature, provided that this reinforcing filler is covered with an inorganic layer, such as silica, or else comprises, at its surface, functional sites, in particular hydroxyl sites, requiring the use of a coupling agent in order to establish the bond between the filler and the elastomer.

Preferably, the content of total reinforcing filler (carbon black and/or reinforcing inorganic filler, such as silica) is within a range from 5 to 120 phr, more preferentially from 5 to 100 phr and more preferentially still from 5 to 90 phr.

The carbon black can advantageously constitute the sole reinforcing filler or the predominant reinforcing filler. Of course, it is possible to use just one carbon black or a blend of several carbon blacks of different ASTM grades. The carbon black can also be used as a blend with other reinforcing fillers and in particular reinforcing inorganic fillers as described above, and in particular silica.

When an inorganic filler (for example silica) is used in the rubber composition, alone or as a blend with carbon black, its content is within a range from 0 to 70 phr, preferably from 0 to 50 phr, in particular also from 5 to 70 phr, and more preferentially still this proportion varies from 5 to 50 phr, particularly from 5 to 40 phr.

Preferably, the elastomer composition comprises various additives.

The rubber compositions can also comprise all or part of the usual additives customarily used in elastomer compositions intended for the manufacture of tyres, such as, for example, plasticizers or extender oils, whether the latter are aromatic or non-aromatic in nature, pigments, protective agents, such as antiozone waxes, chemical antiozonants or antioxidants, antifatigue agents or else adhesion promoters.

Preferably, the elastomer composition comprises a cross-linking system, more preferentially a vulcanization system.

In the embodiment preferentially intended for a tyre use, the elastomer composition comprises a vulcanization system.

The vulcanization system comprises a sulfur-donating agent, for example sulfur.

Preferably, the vulcanization system comprises vulcanization activators, such as zinc oxide and stearic acid.

Preferably, the vulcanization system comprises a vulcanization accelerator and/or a vulcanization retarder.

Advantageously, the composite is such that the elastomer matrix is based on an elastomer composition comprising a crosslinking system comprising a content of molecular sulfur ranging from 1 to 10 phr. Molecular sulfur is understood to mean sulfur resulting from an $S_n$ compound with n>2.

The sulfur content is measured by elemental analysis, using the Thermo Scientific Flash 2000 microanalyser. The analysis comprises a stage of combustion of the sample and then a stage of separation of the compounds formed. Approximately 1 mg of sample is introduced into the microanalyser, where it is subjected to flash combustion of 1000° C. under oxygen. The gases formed are then oxidized by virtue of the excess oxygen and of a tungstic anhydride catalyst. A stage of reduction by passing over copper subsequently makes it possible to trap the excess oxygen and to reduce the nitrogen oxides to give $N_2$ and also the sulfites to give sulfur dioxide $SO_2$. The water is trapped and the $N_2$, $CO_2$ and $SO_2$ compounds formed are subsequently separated on a chromatographic column and then detected by a katharometer. The total sulfur is quantified by measurement of the area of the $SO_2$ peak, after calibration with standards.

The combined vulcanization accelerators, retarders and activators are used at a preferential content within a range from 0.5 to 15 phr. The vulcanization activator(s) is/are used at a preferential content within a range from 0.5 to 12 phr.

The crosslinking system proper is preferentially based on sulfur and on a primary vulcanization accelerator, in particular on an accelerator of the sulfenamide type. Additional to this vulcanization system are various known secondary vulcanization accelerators or vulcanization activators, such as zinc oxide, stearic acid, guanidine derivatives (in particular diphenylguanidine), and the like.

Use may be made, as (primary or secondary) accelerator, of any compound capable of acting as accelerator of the vulcanization of diene elastomers in the presence of sulfur, in particular accelerators of the thiazole type and also their derivatives, accelerators of thiuram type and of zinc dithiocarbamate type. These accelerators are more preferentially selected from the group consisting of 2-mercaptobenzothiazyl disulfide (abbreviated to "MBTS"), N-cyclohexyl-2-benzothiazolesulfenamide (abbreviated to "CBS"), N,N-di-cyclohexyl2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and the mixtures of these compounds. Preferably, use is made of a primary accelerator of the sulfenamide type.

Tyre According to the Invention

The invention also relates to a tyre. The reinforced product of the invention or the elastomer composite of the invention can advantageously be used for the reinforcement of tyres of all types of vehicles, in particular passenger vehicles or industrial vehicles, such as heavy-duty vehicles.

A better understanding of the invention will be obtained on reading the description which will follow, given solely by way of non-limiting example and made with reference to the drawings.

The appended FIG. 1 represents very diagrammatically (without observing a specific scale) a radial section of a tyre in accordance with the invention for a vehicle of the passenger vehicle type.

This tyre 1 comprises a crown 2 reinforced by a crown reinforcement or belt 6, two sidewalls 3 and two beads 4, each of these beads 4 being reinforced with a bead wire 5. The crown 2 is surmounted by a tread, not represented in this diagrammatic figure. A carcass reinforcement 7 is wound around the two bead wires 5 in each bead 4, the turn-up 8 of this reinforcement 7 being, for example, positioned towards the outside of the tyre 1, which is represented here fitted onto its wheel rim 9. The carcass reinforcement 7 is, in a way known per se, formed of at least one ply reinforced by "radial" cords, for example made of textile, that is to say that these cords are positioned virtually parallel to one another and extend from one bead to the other so as to form an angle of between 80° and 90° with the median circumferential plane (plane perpendicular to the axis of rotation of the tyre which is located midway between the two beads 4 and passes through the middle of the crown reinforcement 6).

This tyre 1 of the invention has, for example, the essential characteristic that at least one crown reinforcement 6 comprises a conductive element, in this instance a coated conductive threadlike element or an elastomer composite according to the invention. According to another possible exemplary embodiment of the invention, it is, for example, the bead wires which might be composed, in all or part, of a conductive element, in this instance a coated conductive threadlike element.

Of course, the invention relates to the subject-matters described above, namely the elastomer composite, such as the tyre comprising it, both in the raw state (before crosslinking) and in the cured state (after crosslinking).

Figure 2:
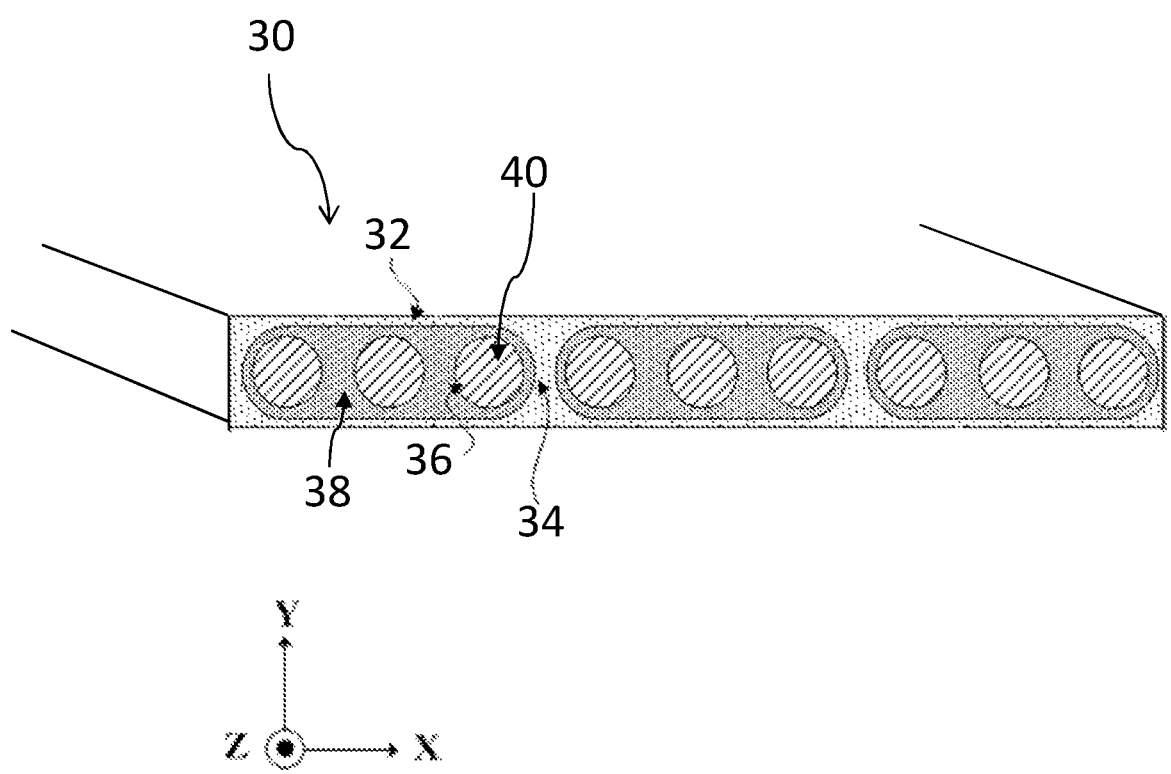
FIG. 2 is a sectional view of a composite according to the invention forming a working ply of the tyre of FIG. 1.

A sectional view of a composite according to the invention, denoted by the general reference 30, forming a working ply of the tyre of FIG. 1, has been represented in FIG. 2. The composite 30 comprises at least one product 34 reinforced by reinforcing elements 36, in the case in point metallic monofilaments, which are embedded in the elastomeric matrix 32.

In FIG. 2, the elastomeric matrix 32, the reinforced product 34 and the reinforcing elements 36 have been represented in an X, Y, Z frame in which the Y direction is the radial direction Y and the X and Z directions are the axial and circumferential directions. In FIG. 2, the composite 30 comprises three reinforced products 34 arranged side by side in the main direction X. Each reinforced product 34 comprises a matrix 38 based on the compounds described above and three threadlike reinforcing elements 36 arranged side by side along the main direction X and extending parallel to one another within the reinforced product 34 and collectively embedded in the matrix 38. Each reinforcing threadlike element 36 comprises, in this instance consists of, a metallic monofilament 40. In an alternative form, each reinforcing threadlike element 36 might be an assembly of several metallic monofilaments.

In another alternative form, each reinforced product 34 comprises a single reinforcing threadlike element 36 individually embedded in the matrix 38. Several reinforced products 34 in accordance with this other alternative form are then embedded in the elastomeric matrix 32. The reinforcing threadlike element 36 can be a metallic monofilament or an assembly of several metallic monofilaments.

Figure 3:
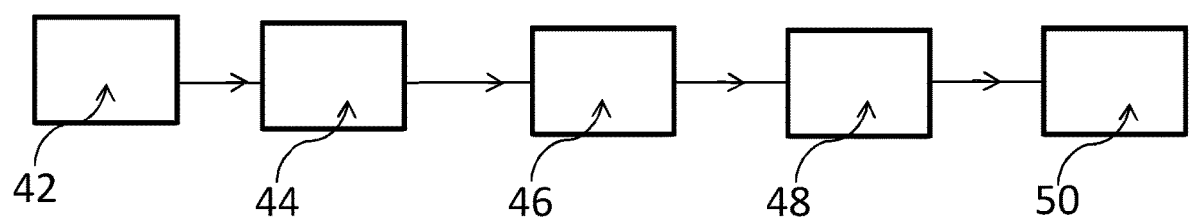
FIG. 3 is a chart illustrating the different stages of a process for the manufacture of a reinforced product according to the invention.

An example of a process for the manufacture of a reinforced product 34 will now be described with reference to FIG. 3.

In a first embodiment, the composition comprises a compound A1 and a compound A2.

During the process, the constituents of the composition are mixed in a stage 42. In order to do this, 30.43 g of a compound A1 are mixed with 19.07 g of a compound A2 at a temperature Tm. In the example described, the compound A1 is 1,2-benzenedicarboxaldehyde, the melting point of which is 57° C. at atmospheric pressure, and the compound A2 is phloroglucinol, the melting point of which is 218° C. at atmospheric pressure. The mixing is carried out at a temperature of 60° C. under atmospheric pressure.

In a stage 44, additives, which can be fillers or drying agents, are added. In this instance, 0.25 g of magnesium sulfate and 0.25 g of carbon black N326 are added.

Subsequently, during a stage 46, the reinforcing elements 36 are drowned in the composition.

Then, during a stage 48, the resin based on 1,2-benzenedicarboxaldehyde and phloroglucinol is crosslinked by heating to at least 110° C. under atmospheric pressure and in this instance 110° C. at atmospheric pressure.

Finally, a stage 50 of final crosslinking of the resin is carried out by heating to a temperature of 180° C. at 1.03 bar.

In the embodiment described here, the reinforced product 36 is obtained, which will subsequently be embedded in an elastomeric composition in order to form the elastomer composite 30 as described above, which will be used in the tyre.

In another embodiment of the invention not described here, the reinforced product 36 is obtained, which will be used directly in the tyre.

The invention is not limited to the embodiments described above.

Examples of compositions employing or not employing the process according to the first embodiment of the invention are collated in Table 1 below.

In Example T1 using 1,4-benzenedicarboxaldehyde and phloroglucinol, the mixture is heated to a temperature of 120° C. at atmospheric pressure in order to melt the compound of lower melting point, in this instance the 1,4-benzenedicarboxaldehyde (the melting point of which is 115° C. at atmospheric pressure). This temperature of 120° C. is greater than or equal to, in this instance equal to, the crosslinking temperature of the resin based on 1,4-benzenedicarboxaldehyde and phloroglucinol. A premature crosslinking of the resin is then observed, which prevents subsequent manipulation of the composition, in particular for any stage during which reinforcing elements would be drowned in the composition. A premature crosslinking of the resin of Example T2 is also observed for the same reasons.

In the other processes according to the invention employing the compositions E1 to E5, the temperature for placing in liquid solution is adjusted to just enough to thus make it possible to dissolve the compound A2 in the compound A1 without, however, the stage of crosslinking of the resin beginning, that is to say that the composition remains liquid for a sufficient open time to thus be able to drown the reinforcing element(s) in the matrix based on this composition and to thus form a reinforced product according to the invention.

In the example of a process employing the composition E1 in accordance with the first embodiment of the invention, the temperatures adhere, at atmospheric pressure, to the following conditions: T1=57° C.≤Tm=60° C.≤Tn=110° C. and T2=218° C.≥Tn=110° C. with T1<T2, 10° C.≤Tn−Tm=50° C.≤60° C., and Tp=180° C.>Tn=110° C. with Tn≥120° C. and Tm≤80° C.

Other examples of compositions employed in processes in accordance with the second embodiment (compositions F1 to F4) and with the third embodiment (F5) of the invention are collated in Tables 2 and 3 below.

In the processes according to the second embodiment of the invention employing the compositions F1 to F4, the temperature for placing in liquid solution is adjusted to just enough to thus make it possible to dissolve two of the compounds A3, A4 and A5 in that of the compounds A3, A4 and A5 exhibiting the lowest melting point without, however, the stage of crosslinking of the resin beginning.

In the example of a process employing the composition F1 in accordance with the second embodiment of the invention, the temperatures adhere, at atmospheric pressure, to the following conditions: Tmin=57° C.≤Tm=60° C.≤Tn=110° C. and Tint=115° C. and Tmax=218° C. are greater than or equal to Tn=110° C., 10° C.≤Tn−Tm=50° C.≤60° C., and Tp=180° C.>Tn=110° C., with Tn≤120° C. and Tm≤80° C.

Thus, it is possible to employ the second embodiment of the process of the invention for the composition comprising 1,4-benzenedicarboxaldehyde and phloroglucinol (Example T1 above) by adding 1,2-benzenedicarboxaldehyde (Composition Example F1 according to the invention). The reactivity of the resin is thus managed by controlling the temperature of dissolution of the various constituents and in particular that of 1,4-benzenedicarboxaldehyde.

In the process according to the third embodiment of the invention employing the composition F5, it is found that it is indeed the compound which has the lowest melting point which will govern the dissolution temperature.

In the example of a process employing the composition F5 in accordance with the invention, the temperatures adhere, at atmospheric pressure, to the following conditions: Tmin=88° C.≤Tm=100° C.≤Tn=110° C. and Tint1=115° C., Tint2=175° C. and Tmax=218° C. are greater than or equal to Tn=110° C., 10° C.≤Tn−Tm=10° C.≤60° C., and Tp=180° C.>Tn=110° C. with Tn≤120° C. and Tm≤100° C.

In this composition F5, just one compound has a melting point of less than 100° C. at atmospheric pressure and the other three have a melting point at atmospheric pressure well above 110° C. Thus, the reactivity of the resin is managed by controlling the dissolution temperature of the various constituents by that which has the lowest melting point.

It will also be possible to combine the characteristics of the various embodiments described or envisaged above, with the proviso that these characteristics are compatible with one another.

TABLE 1

| | Compositions | | | | | | |
|---|---|---|---|---|---|---|---|
| | T1 | T2 | E1 | E2 | E3 | E4 | E5 |
| A1 | 1,4-benzene-dicarboxaldehyde (3) | 1,4-benzene-dicarboxaldehyde (3) | 1,2-benzene-dicarboxaldehyde (1) | 1,3-benzene-dicarboxaldehyde (2) | 1,2-benzene-dicarboxaldehyde (1) | 1,3-benzene-dicarboxaldehyde (2) | 5-(hydroxy-methyl)furfural (4) |
| T1 | 115° C. | 115° C. | 57° C. | 88° C. | 57° C. | 88° C. | 31° C. |
| A2 | phloroglucinol (5) | resorcinol sulfide (6) | phloroglucinol (5) | phloroglucinol (5) | resorcinol sulfide (6) | resorcinol sulfide (6) | phloroglucinol (5) |
| T2 | 218° C. | 175° C. | 218° C. | 218° C. | 175° C. | 175° C. | 218° C. |
| T2 − T1 | 103° C. | 60° C. | 161° C. | 130° C. | 118° C. | 87° C. | 187° C. |
| Temperatures of the stages of the process | | | | | | | |
| Tm | 120° C. | 120° C. | 60° C. | 90° C. | 60° C. | 90° C. | 60° C. |
| Tm − T1 | 5° C. | 5° C. | 3° C. | 2° C. | 3° C. | 2° C. | 29° C. |
| Tn | 120° C. | 120° C. | 110° C. | 110° C. | 110° C. | 110° C. | 110° C. |
| Tn − Tm | 0° C. | 0° C. | 50° C. | 20° C. | 50° C. | 20° C. | 50° C. |
| Tp | 180° C. | 180° C. | 180° C. | 180° C. | 180° C. | 180° C. | 180° C. |
| Process in accordance with the invention | no | no | yes 1$^{st}$ embodiment | yes 1$^{st}$ embodiment | yes 1$^{st}$ embodiment | yes 1$^{st}$ embodiment | yes 1$^{st}$ embodiment |

(1) 1,2-benzenedicarboxaldehyde (from Sigma-Aldrich; of 99% purity);

(2) 1,3-benzenedicarboxaldehyde (from Sigma-Aldrich; of 99% purity);

(3) 1,4-benzenedicarboxaldehyde (from Sigma-Aldrich; of 99% purity);

(4) 5-(hydroxymethyl)furfural (from Aldrich; of 99% purity);

(5) phloroglucinol (from Sigma-Aldrich; of 99% purity);

(6) resorcinol sulfide (from Sigma-Aldrich; of 99% purity).

TABLE 2

| | Compositions | | | | |
|---|---|---|---|---|---|
| | F1 | F2 | F3 | F4 | F5 |
| A3 | 1,2-benzenedicarboxaldehyde (1) | 1,3-benzenedicarboxaldehyde (2) | 1,2-benzenedicarboxaldehyde (1) | 1,3-benzenedicarboxaldehyde (2) | 1,3-benzenedicarboxaldehyde (2) |
| A4 | 1,4-benzenedicarboxaldehyde (3) | 1,4-benzenedicarboxaldehyde (3) | 1,4-benzenedicarboxaldehyde (3) | 1,4-benzenedicarboxaldehyde (3) | 1,4-benzenedicarboxaldehyde (3) |
| T3 | 57° C. | 88° C. | 57° C. | 88° C. | 88° C. |
| T4 | 115° C. | 115° C. | 115° C. | 115° C. | 115° C. |
| A5 | phloroglucinol (5) | phloroglucinol (5) | resorcinol sulfide (6) | resorcinol sulfide (6) | phloroglucinol (5) |
| A6 | — | — | — | — | resorcinol sulfide (6) |
| T5 | 218° C. | 218° C. | 175° C. | 175° C. | 218° C. |
| T6 | — | — | — | — | 175° C. |
| Tmin | 57° C. | 88° C. | 57° C. | 88° C. | 88° C. |
| Tmax | 218° C. | 218° C. | 175° C. | 175° C. | 218° C. |
| Tint | 115° C. | 115° C. | 115° C. | 115° C. | — |
| Tint1 | — | — | — | — | 115° C. |
| Tint2 | — | — | — | — | 175° C. |
| Tmax − Tmin | 161° C. | 130° C. | 118° C. | 87° C. | 130° C. |

TABLE 3

| | Compositions | | | | |
|---|---|---|---|---|---|
| | F1 | F2 | F3 | F4 | F5 |
| | Temperatures of the stages of the process | | | | |
| Tm | 60° C. | 90° C. | 60° C. | 90° C. | 100° C. |
| Tm − Tmin | 3° C. | 2° C. | 3° C. | 2° C. | 12° C. |
| Tn | 110° C. | 120° C. | 110° C. | 120° C. | 110° C. |
| Tn − Tm | 50° C. | 30° C. | 50° C. | 30° C. | 10° C. |
| Tp | 180° C. | 180° C. | 180° C. | 180° C. | 180° C. |
| Process in accordance with the invention | yes 2$^{nd}$ embodiment | yes 2$^{nd}$ embodiment | yes 2$^{nd}$ embodiment | yes 2$^{nd}$ embodiment | yes 3$^{nd}$ embodiment |

The invention claimed is:

1. A process for the manufacture of a reinforced product comprising a matrix based on a composition and at least one reinforcing element, the at least one reinforcing element being embedded in the matrix, the process comprising the steps:
   making the composition comprising at least one compound A1, exhibiting a melting point T1, and at least one compound A2, exhibiting a melting point T2, by mixing the at least one compound A1 and the at least one compound A2 at a temperature Tm such that T1≤Tm<T2, so as to dissolve the at least one compound A2 in the at least one compound A1 and to obtain the composition in a liquid state, the composition being free of organic solvent and water;
   submerging the at least one reinforcing element in the composition in the liquid state;
   a first crosslinking step in which the at least one compound A1 is reacted with the at least one compound A2 to form a resin by heating from a temperature Tm, crosslinking the resin based on the at least one compound A1 and on the at least one compound A2 by heating the composition to at least a temperature Tn such that T1≤Tm<Tn, so as to form the matrix in which the at least one reinforcing element is embedded; and
   a second crosslinking step in which the resin is heated to a temperature Tp with Tn<Tp.

2. The process according to claim 1, wherein Tn−Tm≥5° C.

3. The process according to claim 1, wherein Tn−Tm≤100° C.

4. The process according to claim 1, wherein the temperature Tp≤200° C.

5. The process according to claim 1, wherein at least one of the at least one compound A1 and the at least one compound A2 is selected from the group consisting of:
   a compound A11 comprising at least two functional groups, one of the at least two functional groups being a hydroxymethyl functional group and the other of the at least two functional groups being an aldehyde functional group or a hydroxymethyl functional group;
   a compound A12 comprising at least one aldehyde functional group; and
   a mixture of a compound A11 and of a compound A12.

6. The process according to claim 5, wherein the compound A12 is selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and mixtures thereof.

7. The process according to claim 5, wherein the compound A12 is selected from the group consisting of furfuraldehyde, 2,5-furandicarboxaldehyde and mixtures thereof.

8. The process according to claim 5, wherein the compound A11 corresponds to the general formula (II):

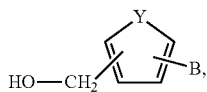 (II)

where B is CHO or CH$_2$OH, Y is O, NR$_1$, NO, S, SO, SO$_2$ or SR$_2$R$_3$, R$_1$ is a hydrogen or an alkyl, aryl, arylalkyl, alkylaryl or cycloalkyl group, and R$_2$ and R$_3$ each are, independently of each other, a hydrogen or an alkyl, aryl, arylalkyl, alkylaryl or cycloalkyl group.

9. The process according to claim 5, wherein the compound A11 corresponds to the general formula (II'a1) or (II'a2):

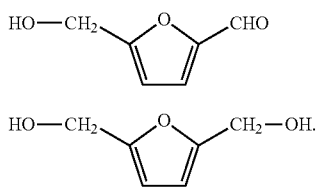

10. The process according to claim 1, wherein at least one of the at least one compound A1 and the at least one compound A2 is a phenol selected from the group consisting of:

an aromatic polyphenol A21 comprising at least one aromatic nucleus bearing at least two hydroxyl functional groups in the meta position with respect to each other, the two positions ortho to at least one of the hydroxyl functional groups being unsubstituted;

an aromatic monophenol A22 comprising at least one six-membered aromatic nucleus bearing a single hydroxyl functional group, the two positions ortho to the hydroxyl functional group being unsubstituted, or at least one position ortho to and the position para to the hydroxyl functional group being unsubstituted; and a mixture of A21 and A22.

11. A reinforced product comprising a matrix and at least one reinforcing element, the at least one reinforcing element being embedded in the matrix, the reinforced product being obtained by the process according to claim 1.

12. A tire comprising at least one reinforced product according to claim 11.

* * * * *